US011998836B2

(12) United States Patent
Kuwatani et al.

(10) Patent No.: US 11,998,836 B2
(45) Date of Patent: Jun. 4, 2024

(54) GAME PROCESSING SYSTEM, METHOD OF PROCESSING GAME, AND STORAGE MEDIUM STORING PROGRAM FOR PROCESSING GAME

(71) Applicant: Gree, Inc., Tokyo (JP)

(72) Inventors: Takashi Kuwatani, Tokyo (JP); Makoto Chida, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 18/128,846

(22) Filed: Mar. 30, 2023

(65) Prior Publication Data

US 2023/0233930 A1 Jul. 27, 2023

Related U.S. Application Data

(63) Continuation of application No. 17/395,137, filed on Aug. 5, 2021, now Pat. No. 11,642,590, which is a
(Continued)

(30) Foreign Application Priority Data

Feb. 6, 2018 (JP) .................................. 2018-019004
Jun. 18, 2018 (JP) .................................. 2018-115088
Nov. 21, 2018 (JP) .................................. 2018-218066

(51) Int. Cl.
*A63F 13/25* (2014.01)
*A63F 13/21* (2014.01)
(Continued)

(52) U.S. Cl.
CPC .............. *A63F 13/25* (2014.09); *A63F 13/21* (2014.09); *A63F 13/26* (2014.09); *A63F 13/428* (2014.09);
(Continued)

(58) Field of Classification Search
CPC .......... A63F 13/25; A63F 13/21; A63F 13/26; A63F 13/428; A63F 2300/8082;
(Continued)

(56) References Cited

U.S. PATENT DOCUMENTS 5,835,077 A * 11/1998 Dao .......................... G01C 9/00
345/157
8,799,810 B1 * 8/2014 Wheeler ................. G06F 3/012
348/208.99

(Continued)

OTHER PUBLICATIONS

Notice of Reasons for Refusal dated Feb. 13, 2024, issued in corresponding Japanese Patent Application No. 2023-069997 with English translation (13 pgs.).

*Primary Examiner* — David L Lewis
*Assistant Examiner* — Matthew D Hoel
(74) *Attorney, Agent, or Firm* — Pillsbury Winthrop Shaw Pittman, LLP

(57) ABSTRACT

A game processing system for processing of a game that provides interaction with a virtual character according to one embodiment includes a storage that stores action data for specifying one or more actions of the virtual character and one or more computer processors. The game includes a VR mode in which the game progresses in accordance with detection information obtained by a head mounted display. The one or more processors determine an action of the player performed toward the virtual character based on the detection information obtained by the head mounted display attached to the head of the player, cause the virtual character to interact with the player based on the action of the player; and suspend execution of the VR mode if a suspension condition is satisfied.

16 Claims, 18 Drawing Sheets

Related U.S. Application Data continuation of application No. 16/863,227, filed on Apr. 30, 2020, now Pat. No. 11,110,346, which is a continuation of application No. 16/268,728, filed on Feb. 6, 2019, now Pat. No. 10,981,052.

(51) Int. Cl.

| | |
|---|---|
| *A63F 13/26* | (2014.01) |
| *A63F 13/428* | (2014.01) |
| *G06F 3/01* | (2006.01) |
| *G06F 3/04817* | (2022.01) |
| *H04L 51/04* | (2022.01) |
| *G02B 27/01* | (2006.01) |
| *G06F 3/0488* | (2022.01) |

(52) U.S. Cl.
CPC .......... *G06F 3/012* (2013.01); *G06F 3/04817* (2013.01); *H04L 51/04* (2013.01); *A63F 2300/8082* (2013.01); *G02B 27/017* (2013.01); *G06F 3/013* (2013.01); *G06F 3/0488* (2013.01)

(58) Field of Classification Search
CPC ...... G06F 3/012; G06F 3/04817; G06F 3/013; G06F 3/0488; H04L 51/04; G02B 27/017
See application file for complete search history.

(56) References Cited

U.S. PATENT DOCUMENTS

| | | | | |
|---|---|---|---|---|
| 8,894,484 B2* | 11/2014 | Latta | ............... | A63F 13/65 463/36 |
| 9,168,454 B2* | 10/2015 | Manning | ............... | G07F 17/32 |
| 9,536,374 B2* | 1/2017 | Manning | ............... | G07F 17/3237 |
| 9,703,369 B1* | 7/2017 | Mullen | ............... | A63F 13/843 |
| 9,744,448 B2* | 8/2017 | Mullen | ............... | A63F 13/00 |
| 9,746,921 B2* | 8/2017 | Mallinson | ............... | G06F 3/016 |
| 9,746,984 B2* | 8/2017 | Stafford | ............... | G06F 3/011 |
| 9,901,816 B2* | 2/2018 | Lee | ............... | A63F 13/212 |
| 9,987,554 B2* | 6/2018 | Stafford | ............... | G06F 3/017 |
| 10,115,238 B2* | 10/2018 | Chen | ............... | G06Q 30/0267 |
| 10,341,612 B2* | 7/2019 | Imaoka | ............... | G02B 27/0093 |
| 10,518,172 B2* | 12/2019 | Chen | ............... | A63F 13/235 |
| 10,870,053 B2* | 12/2020 | He | ............... | A63F 13/426 |
| 10,981,052 B2* | 4/2021 | Kuwatani | ............... | A63F 13/21 |
| 10,983,590 B2* | 4/2021 | Kuwatani | ............... | G02B 27/017 |
| 11,083,959 B2* | 8/2021 | Kuwatani | ............... | A63F 13/5255 |
| 11,090,557 B2* | 8/2021 | Downs | ............... | A63F 13/26 |
| 11,110,346 B2* | 9/2021 | Kuwatani | ............... | A63F 13/21 |
| 11,167,214 B1* | 11/2021 | White | ............... | G06N 3/006 |
| 11,247,128 B2* | 2/2022 | Wu | ............... | G06N 5/01 |
| 11,467,658 B2* | 10/2022 | Kuwatani | ............... | A63F 13/525 |
| 11,500,459 B2* | 11/2022 | Cappello | ............... | G06F 3/013 |
| 2007/0220108 A1* | 9/2007 | Whitaker | ............... | H04M 1/6041 709/217 |
| 2010/0182340 A1* | 7/2010 | Bachelder | ............... | G02B 27/017 345/633 |
| 2011/0035684 A1* | 2/2011 | Lewis | ............... | A63F 13/10 715/753 |
| 2013/0316820 A1* | 11/2013 | Douglas | ............... | A63F 13/212 463/31 |
| 2014/0361956 A1* | 12/2014 | Mikhailov | ............... | G02B 27/0179 345/8 |
| 2015/0182858 A1* | 7/2015 | Angelici | ............... | A63F 13/28 463/35 |
| 2015/0260474 A1* | 9/2015 | Rublowsky | ............... | F41A 33/00 434/16 |
| 2015/0279079 A1* | 10/2015 | Wieczorek | ............... | A63F 13/00 345/473 |
| 2016/0093108 A1* | 3/2016 | Mao | ............... | G02B 27/017 345/633 |
| 2016/0246384 A1* | 8/2016 | Mullins | ............... | G06F 3/017 |
| 2016/0271487 A1* | 9/2016 | Crouse | ............... | A63F 1/00 |
| 2016/0287994 A1* | 10/2016 | Tamaoki | ............... | A63F 13/80 |
| 2017/0076503 A1* | 3/2017 | Tamaoki | ............... | G06F 3/017 |
| 2017/0092235 A1* | 3/2017 | Osman | ............... | G09G 5/38 |
| 2017/0169658 A1* | 6/2017 | Froy | ............... | G07F 17/3206 |
| 2017/0182414 A1* | 6/2017 | Oishi | ............... | A63F 13/5255 |
| 2017/0269685 A1* | 9/2017 | Marks | ............... | A63F 13/533 |
| 2018/0262717 A1* | 9/2018 | Imaoka | ............... | G06F 3/0338 |
| 2019/0240569 A1* | 8/2019 | Kuwatani | ............... | A63F 13/428 |
| 2019/0240570 A1* | 8/2019 | Kuwatani | ............... | A63F 13/211 |
| 2019/0243445 A1* | 8/2019 | Kuwatani | ............... | A63F 13/87 |
| 2020/0254337 A1* | 8/2020 | Kuwatani | ............... | G06F 3/04817 |
| 2021/0165482 A1* | 6/2021 | Kuwatani | ............... | G02B 27/017 |
| 2021/0322868 A1* | 10/2021 | Kuwatani | ............... | A63F 13/26 |

* cited by examiner

GAME PROCESSING SYSTEM, METHOD OF PROCESSING GAME, AND STORAGE MEDIUM STORING PROGRAM FOR PROCESSING GAME

CROSS-REFERENCE TO RELATED APPLICATIONS

This Application is a Continuation Application of U.S. Ser. No. 17/395,137, filed on Aug. 5, 2021 which is a Continuation Application of U.S. Ser. No. 16/863,227, filed on Apr. 30, 2020, now U.S. Pat. No. 11,110,346, which is a Continuation Application of U.S. Ser. No. 16/268,728, filed on Feb. 6, 2019, now U.S. Pat. No. 10,981,052, and claims the benefit of priority under 35 U.S.C. 119 from Japanese Patent Application Serial No. 2018-019004 (filed on Feb. 6, 2018), Japanese Patent Application Serial No. 2018-115088 (filed on Jun. 18, 2018) and Japanese Patent Application Serial No. 2018-218066 (filed on Nov. 21, 2018), the contents of which are hereby incorporated by reference in its entirety.

TECHNICAL FIELD

The present disclosure relates to a game processing system for processing a game that provides interaction with a virtual character, a method of processing a game, and a storage medium storing a program for processing a game.

BACKGROUND

Simulation games that provide interaction with a virtual character are known. An example of the simulation game is disclosed in Japanese Patent Application Publication No. 2017-184842 ("the '842 Publication").

In such a simulation game, reactions that a virtual character makes in response to an operation input by a player are predetermined. For example, in the '842 Publication, a number of response alternatives to a question made by a virtual character is presented to a player, and the player selects one of the response alternatives. The next question from the virtual character is predetermined for each alternative, and the virtual character may ask the next question according to the selection of the player.

Games providing such interaction with a virtual character may utilize a head mounted display (hereinafter may be referred to as "HMD") in order to enhance player's sense of immersion in the games. For example, known is a VR game in which a virtual space is displayed on an HMD, and a player wearing the HMD can interact with a virtual character appearing in the virtual space. "SUMMER LESSON" which is a product of BANDAI NAMCO Entertainment Co., Ltd. is known as this type of VR game (see "Summer Lesson", [online], retrieved on 12, Dec., 2017, Internet (URL: HYPERLINK "http://summer-lesson.bn-ent.net/).

In the game "SUMMER LESSON," realized is a function of specifying an interaction with a virtual character depending on detection information obtained by a tracking sensor of the HMD and causing the player to experience the specified interaction.

For example, when the player wearing the HMD nods in response to a movement of an image of a virtual character displayed on the HMD, a motion of the player's head corresponding to the nodding is detected. Based on the detected motion of the head, an image of the virtual character that performs an action responding to the nodding of the player is displayed on the HMD.

In this way, a conventional VR game in which interaction with a virtual character is performed using the HMD, an image of a virtual space is displayed so as to follow a motion of a player's head, and the player experiences interaction with the virtual character in accordance with the motion of the head so that the player can obtain a high immersion feeling.

When a player interacts with a virtual character using an HMD, the player may perform various actions toward the virtual character. When actions of the player toward the virtual character are diversified, there arises a problem that the amount of data of information for specifying the actions (reactions) of the virtual character to be made in response to the player's action increases.

SUMMARY

It is an object of the present disclosure to provide a technical improvement which solves or alleviates at least part of the drawbacks of the prior art mentioned above.

A game processing system according to one aspect of the disclosure includes a storage that stores action data for specifying one or more actions of a virtual character and one or more computer processors. The system performs processing of a game that provides interaction with the virtual character. In the game processing system, the one or more processors execute computer readable instructions to determine an action which a player performed toward the virtual character based on detection information obtained by a head mounted display attached to a head of the player, cause the virtual character to perform a first action based on the action of the player and first action data among the action data for specifying the one or more actions of the virtual character, and suspend execution of the first action when a suspension condition is satisfied during the execution of the first action.

In the game processing system, the one or more computer processors may cause the virtual character to perform a second action based on the action of the player and second action data among the action data for specifying the one or more actions of the virtual character when the suspension condition is satisfied.

In the game processing system, the game may include a first scene and a second scene, the first action may be executed in the first scene, and the one or more computer processors may suspend execution of the first scene when the suspension condition is satisfied.

In the game processing system, the one or more computer processors may cause switching to a second scene of the game when the suspension condition is satisfied.

In the game processing system, the game may include a first mode in which the game progresses in accordance with an input from an information processing device unattached to the head of the player and a second mode in which the game progresses in accordance with the detection information of the head mounted display. The first action may be executed in the second mode, and the one or more computer processors may suspend the second mode and perform a switch process for switching to the first mode when the suspension condition is satisfied.

In the game processing system, the game may include a first scene and a second scene, the first action may be executed in the first scene, the one or more computer processors may cause displaying a scene transition screen on a display when the suspension condition is satisfied, and the scene transition screen is also displayed on the display when switching from the first scene to the second scene is performed.

In the game processing system, the first action may include a main action composed of a series of actions of the virtual character, an interrupt action executed while the main action is suspended, and a return action performed after execution of the interrupt action.

In the game processing system, the one or more computer processors may determine whether the suspension condition is satisfied in response to a specific action performed by the player during the execution of the first action, and executes the interrupt action when it is determined that the suspension condition is not satisfied.

In the game processing system, the suspension condition may include that a gazing point determined based on the detection information is located on a prohibited area set in a virtual space.

In the game processing system, the suspension condition may include that the player repeats a same action more than a predetermined number of times.

In the game processing system, the suspension condition may include that the player performs an action on a predetermined part of the virtual character more than a predetermined number of times.

In the game processing system, the suspension condition may include that the player performs an action deemed as a banned action.

In the game processing system, the storage may store a parameter, the one or more computer processors may update the parameter in accordance with an action of the player, and the suspension condition may include a condition related to the parameter.

A method of processing a game according to another aspect of the disclosure is the method of processing a game that provides interaction with a virtual character by executing computer readable instructions by one or more computer processor. The method includes determining an action which a player performed toward the virtual character based on detection information obtained by a head mounted display attached to a head of the player, causing the virtual character to perform a first action based on the action of the player and first action data among action data for specifying one or more actions of the virtual character, and suspending execution of the first action when a suspension condition is satisfied during the execution of the first action.

A computer-readable tangible non-transitory storage medium according to another aspect of the disclosure stores a program for processing a game that provides interaction with a virtual character. The computer-readable tangible non-transitory storage medium includes executable instructions that, when executed, cause one or more computer processors to perform: a step of determining an action which a player performed toward the virtual character based on detection information obtained by a head mounted display attached to a head of the player, a step of causing the virtual character to perform a first action based on the action of the player and first action data among action data for specifying one or more actions of the virtual character, and a step of suspending execution of the first action when a suspension condition is satisfied during the execution of the first action.

A game processing system according to still yet another aspect of the disclosure includes a storage that stores scene data concerning each of a plurality of game scenes constituting a scenario of a game, and one or more computer processors, and performs processing of the game. The one or more processors may execute computer readable instructions to progress the game based on detection information obtained by a head mounted display attached to a head of a player, and to suspend execution of a first scene among the plurality of game scenes when a suspension condition is satisfied during the execution of the first scene.

According to the aspects, it is possible to prevent increase in the amount of data of information for specifying the actions (reactions) of the virtual character.

DESCRIPTION OF THE EMBODIMENTS

Figure 1:
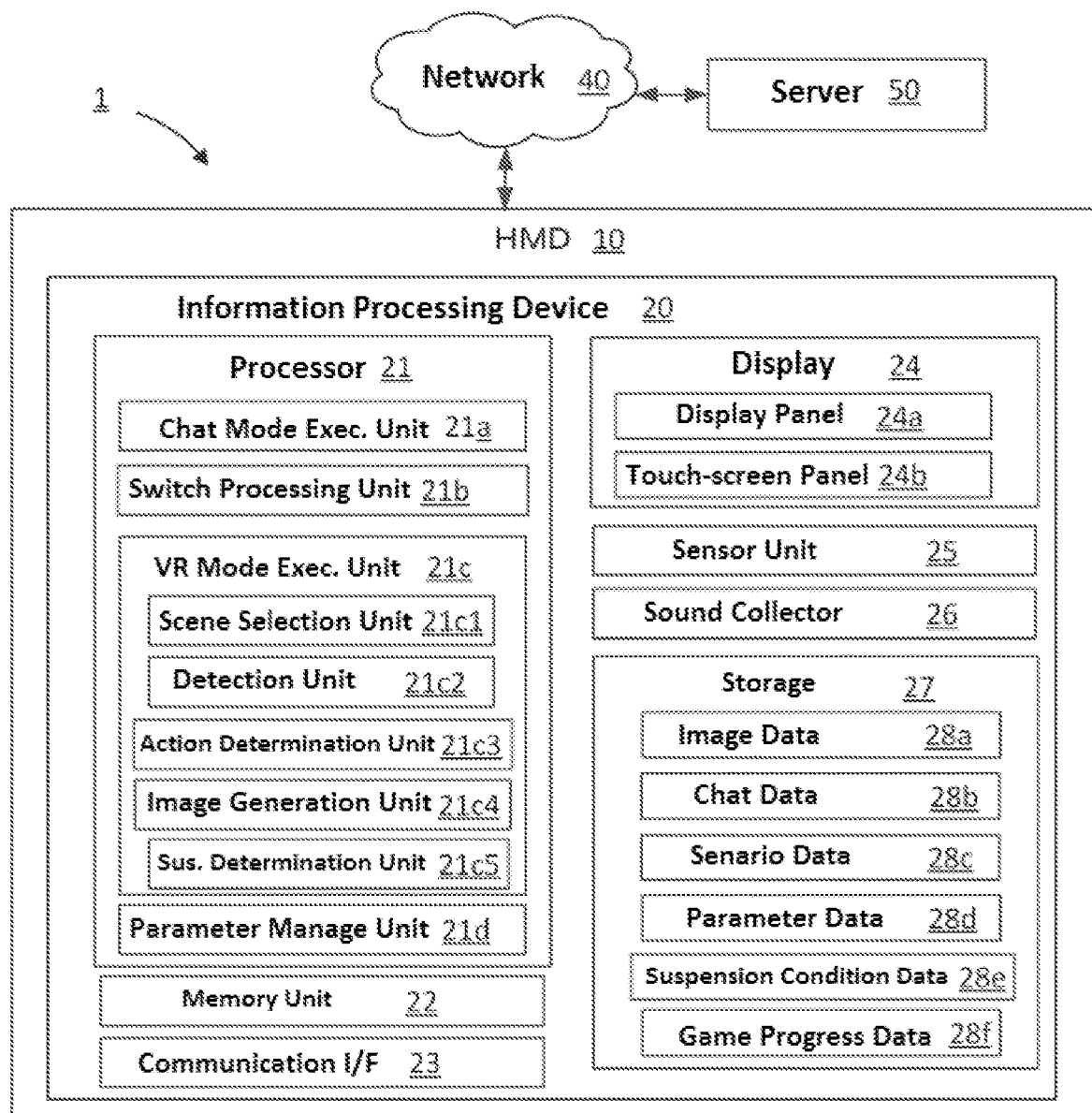
FIG. 1 is a block diagram illustrating a game processing system according to an embodiment.

Various embodiments of the disclosure will be described hereinafter with reference to the accompanying drawings. Throughout the drawings, the same or similar components are denoted by the same reference numerals.

Figure 2:
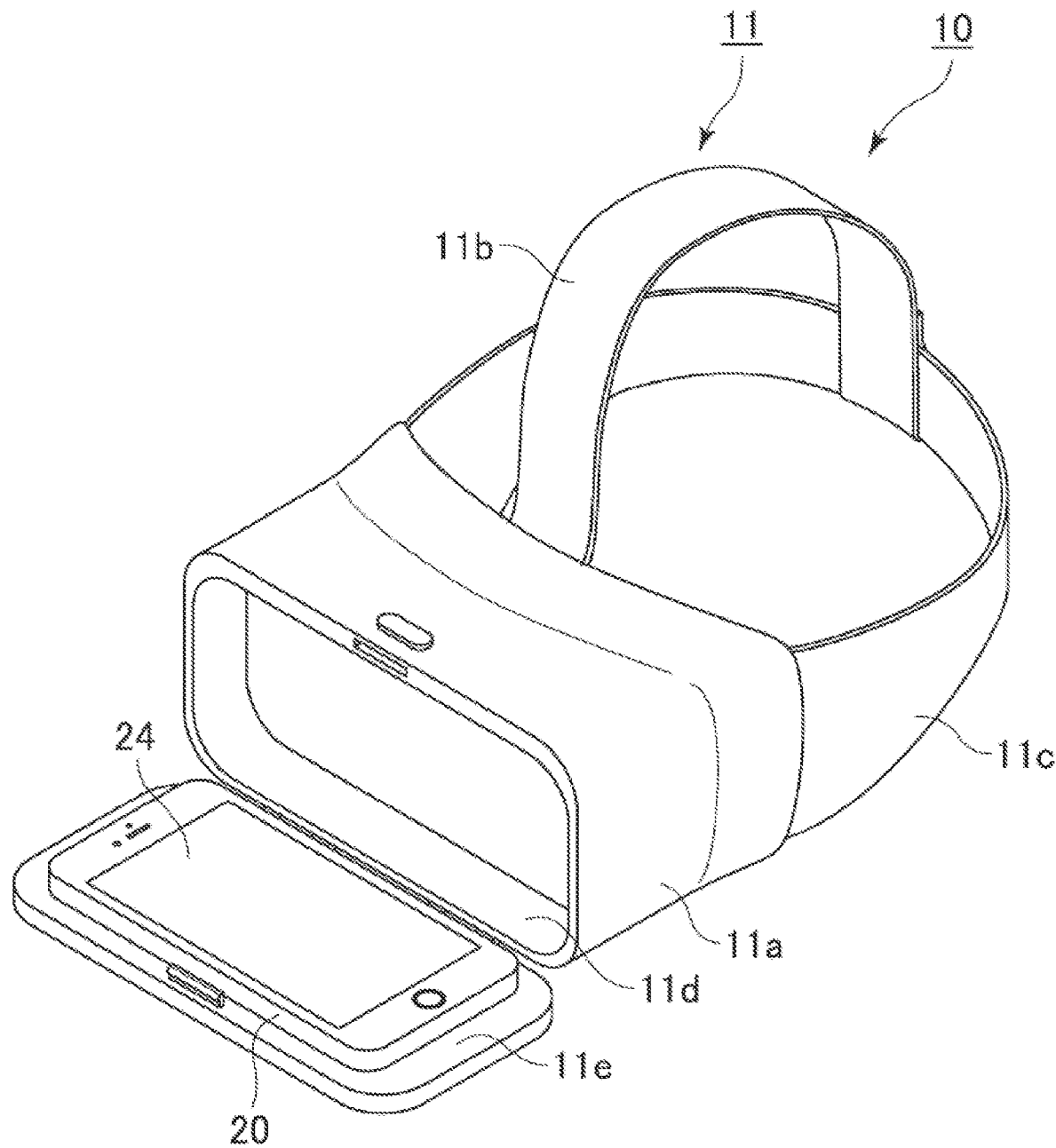
FIG. 2 is a schematic diagram showing a head mounted display usable in the game processing system of FIG. 1.
Figure 3:
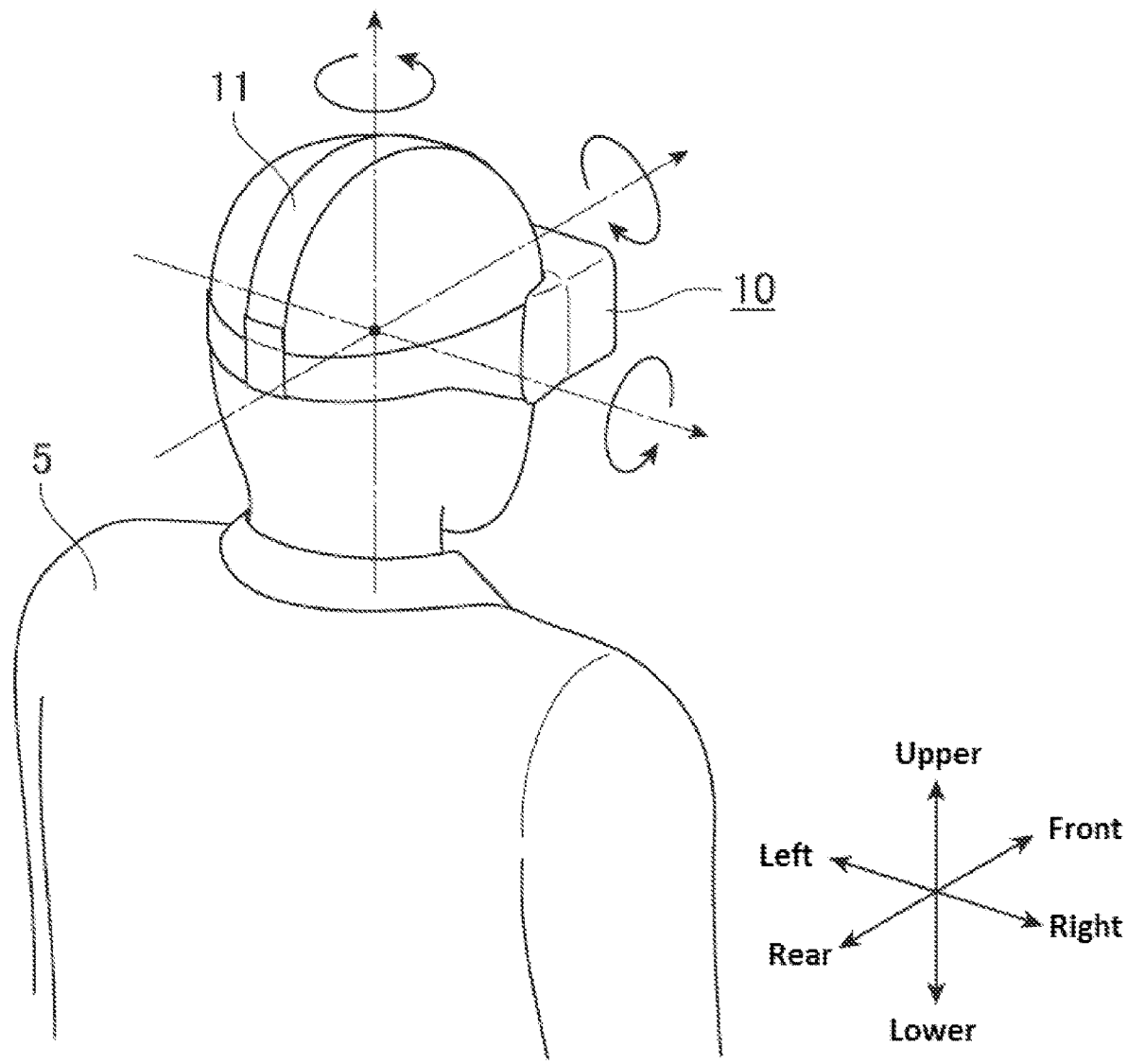
FIG. 3 is a diagram schematically showing the head mounted display worn by a player of the game.

With reference to FIGS. 1 to 3, a game processing system according to an embodiment of the disclosure will be described. FIG. 1 is a block diagram of a game processing system 1 according to an embodiment, FIG. 2 schematically illustrates a head mounted display 10 (hereinafter referred to as "HMD 10") used in the game processing system 1, and FIG. 3 schematically illustrates the HMD 10 mounted on a player 5.

The game processing system 1 according to an embodiment realizes various games by executing game processing programs according to an embodiment. Using the game processing system 1, the player is able to play various games using a game content(s). Game contents are electronic data that are used in a game and can be acquired, owned, used, managed, exchanged, integrated, reinforced, sold, abandoned, or donated in the game by users. The game contents may be, for example, a card, an item, a virtual currency, a ticket, a character, an avatar, level information, status information, parameter information (health, attack, and the like), and statics information, skills, abilities, magic and jobs, and any other various electronic data usable in the game. However, the game contents usable in the game processing system 1 and how the game contents are used may not be limited to those described in this specification. For example, the game processing system 1 can realize a game in which a virtual character and the player interact in a virtual space. The game realized by the game processing system 1 has a first mode and a second mode. An example of the first mode is a chat mode, and an example of the second mode is a VR mode. The first mode and the second mode will be described later.

The game processing system 1 includes the HMD 10 and a server 50. The HMD 10 and the server 50 are communicably interconnected over a network 40.

As shown in FIG. 2, the HMD 10 includes an attachment 11 that is to be fitted on a human head and an information processing device 20 attached to the attachment 11.

The attachment 11 includes a goggle-like casing 11a having an opening 11d formed therein, a first belt 11b and a second belt 11c attached to the casing 11a, and a cover 11e. The cover 11e is attached to the casing 11a such that it is openable and closable. An opening 11d is formed in a front portion of the casing 11a. FIG. 2 shows the state where the cover 11e is open. When the HMD 10 is used, the cover 11e is closed so as to close the opening 11d.

The information processing device 20 is detachably provided on an inner side of the cover 11e of the HMD 10. The information processing device 20 includes a display 24. The information processing device 20 is attached to the cover 11e such that the display 24 faces the inside of the casing 11a when the cover 11e is closed. The information processing device 20 is attached to the attachment 11 when the HMD 10 is used. When the HMD 10 is not used, the information processing device 20 is detached from the attachment 11.

In the illustrated embodiment, the information processing device 20 is a smartphone. In addition to the smartphone, the information processing device 20 may be a mobile phone, a tablet, a personal computer, an electronic book reader, a wearable computer, a game console, or any other information processing devices. The information processing device 20 detached from the HMD 10 is operated by the player 5 in the first mode as described later. In addition to games, the information processing device 20 detached from the HMD 10 may be used for telephone calls and Internet accesses depending on its originally intended use.

The information processing device 20 includes the display 24 as described above. In the illustrated embodiment, when the information processing device 20 is mounted on the attachment 11, the display 24 serves as an apparatus for displaying an image in the HMD 10. Accordingly, when the HMD 10 is used to play a game, a virtual space and a virtual character(s) of the game, and images related to other games are displayed on the display 24.

The shape of the attachment 11 is not limited to the illustrated goggle type. The attachment 11 may include a structure of any shape that moves following the movement of the head of the player who wears the HMD and that can place the display 24 in front of the wearer's eye(s) when worn. For example, the attachment 11 may have an eyeglasses-like shape, a hat-like shape, or a helmet-like shape. In order to enhance player's sense of immersion, the HMD 10 may be configured such that the display 24 covers both eyes of the player when the attachment 11 is attached to the head of the player.

When the HMD is used, the HMD 10 is mounted on the head of the player 5 via the attachment 11, as shown in FIG. 3. The information processing device 20 is mounted on the attachment 11 attached to the head of the player 5.

The information processing device 20 will be further described with referring again to FIG. 1. As illustrated, in one embodiment, the information processing device 20 includes a computer processor 21, a memory unit 22, a communication I/F 23, a display 24, a sensor unit 25, a sound collector 26, and a storage 27.

The computer processor 21 is a computing device which loads various programs realizing an operating system and game logics from the storage 27 or other storage into the memory unit 22 and executes instructions included in the loaded programs. The computer processor 21 is, for example, a CPU, an MPU, a DSP, a GPU, any other computing device, or a combination thereof. The processor 21 may be realized by means of an integrated circuit such as ASIC, PLD, FPGA, MCU, or the like. Although the computer processor 21 is illustrated as a single component in FIG. 1, the computer processor 21 may be a collection of a plurality of physically separate computer processors. In this specification, a program or instructions included in the program that are described as being executed by the computer processor 21 may be executed by a single computer processor or distributed and executed by a plurality of computer processors. Further, a program or instructions included in the program executed by the computer processor 21 may be executed by a plurality of virtual computer processors.

The memory unit 22 is used to store instructions that may be executed by the computer processor 21 and other various data. At least a part of the game processing program in the embodiment is loaded into the memory unit 22 at appropriate timings in accordance with the progress of the game. The memory unit 22 is, for example, a main storage device (main memory) that the computer processor 21 is able to access at high speed. The memory unit 22 may be, for example, a RAM such as a DRAM or an SRAM.

The communication I/F 23 may be implemented as hardware, firmware, or communication software such as a TCP/IP driver or a PPP driver, or a combination thereof. The information processing device 20 is able to transmit and receive data to and from other devices via the communication I/F 23.

The display 24 includes a display panel 24a and a touch-screen panel 24b. For example, the touch-screen panel 24b is laminated on an upper surface or lower surface of the display panel 24a. The display panel 24a is a liquid crystal panel, an organic EL panel, an inorganic EL panel, or any other display panel capable of displaying an image. The touch-screen panel 24b is configured to detect touch interactions (touch operations) performed by the player. The touch-screen panel 24b can detect various touch operations such as tapping, double tapping, and dragging performed by the player. The touch-screen panel 24b may include a capacitive proximity sensor and may be capable of detecting a non-contact operation performed by the player.

The sensor unit 25 includes one or more sensors. The sensor unit 25 includes, for example, at least one selected from the group consisting of a gyro sensor, an acceleration sensor, and a geomagnetic sensor. The sensor unit 25 may include an eye tracking sensor that directly detects player's eye movements. The eye tracking sensor is, for example, an eye-gaze tracking sensor that emits a near-infrared light beam into the iris and detects its reflected light. The position and the direction of the head of the player 5 wearing the HMD 10 are specified based on detection information obtained by the sensor unit 25 as described later. At least some of the various sensors included in the sensor unit 25 may be mounted on the attachment 11 and/or a member other than the attachment 11 different from the information processing device 20.

The sound collector 26 is capable of collecting sound and voice. The sound collector 26 is, for example, a microphone. Sound and voice of the player 5 is detected based on audio information collected by the sound collector 26.

The storage 27 is an external storage device accessed by the computer processor 21. The storage 27 is, for example, a magnetic disk, an optical disk, a semiconductor memory, or various other storage device capable of storing data. Various programs such as a game processing program and the like are stored in the storage 27. The storage 27 may also store various data used in a game(s). At least some of the programs and various data that can be stored in the storage 27 may be stored in a storage that is physically separated from the information processing device 20.

In the illustrated embodiment, the storage 27 stores image data 28a, chat data 28b, scenario data 28c, parameter data 28d, suspension condition data 28e, game progress data 28f, and various other data necessary for progress of the game.

The image data 28a includes data for drawing a background in a virtual space where a game is executed, data for drawing a virtual character, and data for drawing an object other than the virtual character used in the game. The image data 28a may include information about the position of an object in the virtual space.

The chat data 28b includes data for drawing an icon of a virtual character, data for drawing an icon of the player 5, data for specifying a plurality of messages from a virtual character, data representing options of a response message to the plurality of messages from the virtual character, and any other data used in the chat. The plurality of messages from the virtual character may be defined in a tree structure that includes nodes corresponding to each message and in which the nodes are interconnected by arcs. In the tree structure, for example, more than one arc extends from a start message which is the root node existing at the top, and each arc is connected to a node situated at a lower level. Another arc also extends from the lower node, and the arc is connected to a not at a further lower level. The nodes at the lower levels each correspond to a possible message from a virtual character that may be displayed after the start message. The chat data 28b may include a mode switch condition that is a condition for starting a mode switch from the chat mode to the VR mode. The mode switch condition may include, for example, that the elapsed time since the game was started in the chat mode is equal to or longer than a predetermined length of time, that a chat has progressed to a terminal node in a message having the tree structure, and any other conditions. The chat data 28b may include data indicating a message that is to be displayed when the chat mode is resumed after selection of a switch object is not completed.

The scenario data 28c includes data defining a scenario experienced by the player 5 in the second mode (eg., the VR mode) of the game. When there are two or more scenarios experienced by the player 5 in the game, the scenario data 28c may define scenario data for each of the scenarios.

Figure 4:
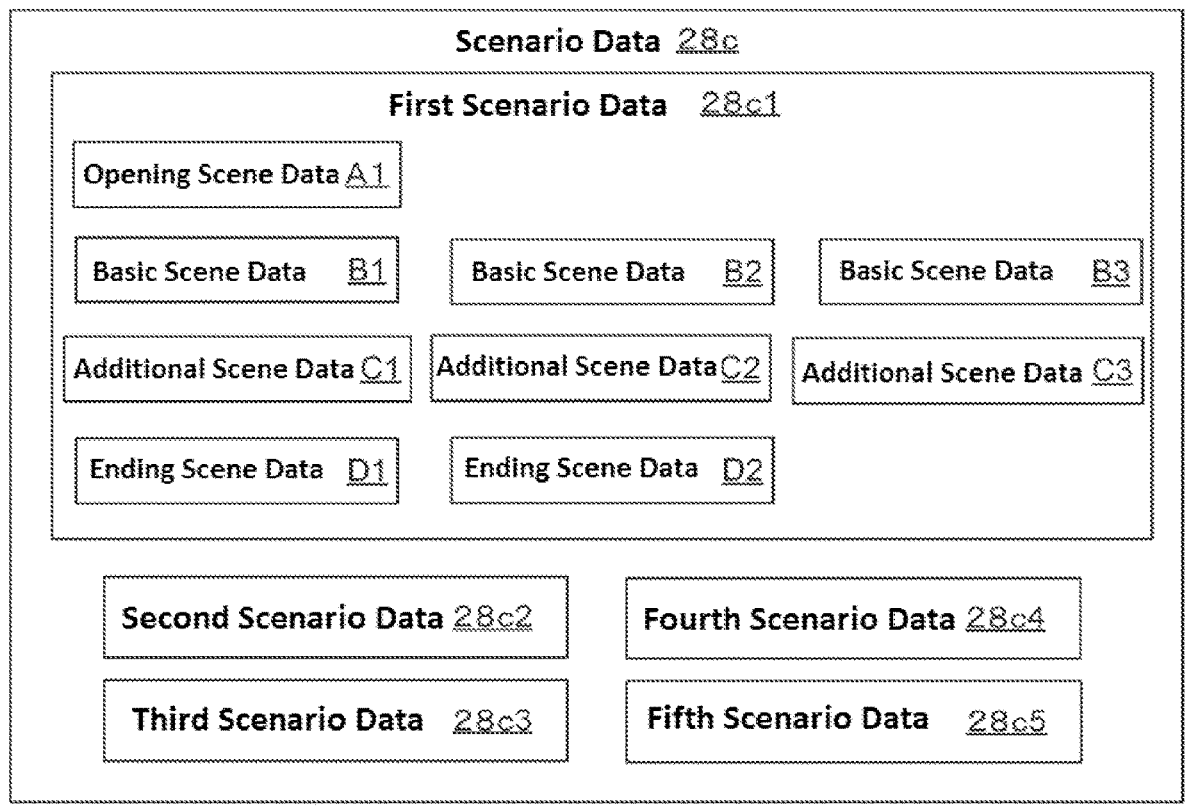
FIG. 4 schematically illustrates scenario data.

With reference to FIG. 4, scenario data used in the game processing system according to an embodiment will be described. FIG. 4 schematically shows the scenario data 28c used in the game processing system 1. The scenario data 28c is a data set for defining a scenario to be executed in the VR mode. In the illustrated embodiment, the scenario data 28c includes first scenario data 28c1 to fifth scenario data 28c5 corresponding to a first scenario to a fifth scenario, respectively. There may be six or more scenarios or may be four or less scenarios in the VR mode. Data structure of the first scenario data 28c1 corresponding to the first scenario will be now described. The description on the first scenario data 28c1 below also applies to the second scenario data 28c2 to the fifth scenario data 28c5.

In the illustrated embodiment, the first scenario data 28c1 includes opening scene data A1, basic scene data B1 to B3, additional scene data C1 to C3, and ending scene data D1 to D2. In one embodiment, the opening scene data A1, the basic scene data B1 to B3, the additional scene data C1 to C3, and the ending scene data D1 to D2 may each include data concerning actions of a virtual character in a corresponding scene, data concerning moving images used in the scene, data concerning actions that the player can perform toward the virtual character in the scene, and any other data necessary for executing the scene.

In the illustrated embodiment, the opening scene data A1 includes data concerning an action of the virtual character in an opening scene executed after the first scenario has started, data concerning a moving image used in the opening scene, data concerning actions that the player can perform toward the virtual character in the opening scene, and any other data necessary for executing the opening scene.

The basic scene data B1 to B3 include data concerning actions of the virtual character in a basic scene executed after the opening scene, data concerning a moving image used in the basic scene, data concerning actions that the player can perform toward the virtual character in the opening scene, and any other data necessary for executing the basic scene. The basic scene data B1 to B3 may each include information indicating conditions for switching to an additional scene to determine whether switching to the additional scene is possible or not. The condition for switching to the additional scene may be determined for each basic scene. The condition for switching to the addition scene is, for example, that the player gazes at a predetermined object for a predetermined period of time or longer, the player does not look fixedly at a predetermined direction, and the player does a prescribed action. Other than the above-mentioned ones, the conditions for switching to the addition scene can be appropriately determined depending on the story of a scenario, a type of an object appearing in the virtual space, and other factors.

The additional scene data C1 to C3 include data concerning actions of the virtual character in an additional scene, data concerning a moving image used in the additional scene, data concerning actions that the player can perform toward the virtual character in the opening scene, and any other data necessary for executing the additional scene. It is determined whether the condition for switching to the additional scene is satisfied during or after the basic scene is executed, and then the additional scene is executed in accordance with the determination result.

The ending scene data D1 to D2 may include data necessary for executing an ending scene before the second mode is terminated. The ending scene data D1 to D2 include data concerning actions of the virtual character in the ending scene, data concerning a moving image used in the ending scene, data concerning actions that the player can perform toward the virtual character in the opening scene, and any other data necessary for executing the ending scene.

The parameter data 28d includes a game parameter relating to a game realized in the game processing system 1. The game parameter may be a parameter relating to a player character. The parameter relating to the player character may include a parameter representing a virtual character's favorability rating for a user character. Here, the virtual character is a non-player character. The game parameter may be updated as the game progresses. The parameter relating to the player character is not limited to the parameter representing the virtual character's favorability rating for the user character. The parameter relating to the player character is appropriately determined according to a type, the nature, the worldview of the game, or other elements.

The suspension condition data 28e is data defining an suspension condition which is a condition for suspending the game being executed in the VR mode or suspending an action being executed in the game. The suspension condition includes, for example, that a prohibited area set in the virtual space has been watched by the player, that the player 5 repeats the same action toward a virtual character for a predetermined number of times or more, the player 5 performs an action toward a predetermined body part of the virtual character at a predetermined number of times or more, the player performs a banned action, a given parameter included in the parameter data 28d is equal to or greater than a predetermined threshold value, and any other conditions defined for suspending the execution of the game in the VR mode. The suspension condition data 28e may include data concerning the coordinates indicating the prohibited area and data specifying the banned actions. Points may be added each time the player 5 does the same action, and the suspension condition may be that the accumulated points reach to or more than predetermined points. Moreover, some points may be initially given to the player 5, and predetermined points may be subtracted from the initially given points to calculate the points that the player 5 currently holds each time the player 5 do the same action. In this case, the suspension condition may be that the points that the player 5 holds reduces to or less than a predetermined value. The accumulated points and the points that the player 5 holds may be reset during the game.

The game progress data 28f includes data used for managing the progress of the game. The game progress data 28f may be updated as the game progresses. The game progress data 28f may include, for example, data concerning points acquired by the player in the game, data indicating an action performed by the player 5 toward the virtual character, and any other various types of data that may vary depending on the progress of the game. The data indicating the action performed by the player 5 toward the virtual character may include data indicating a body part (for example, a head, a shoulder, an arm, or a part other than these) of the virtual character onto which the action is performed.

The components and functions of the information processing device 20 shown in FIG. 1 are examples. The information processing device 20 applicable to the invention may include various constituent elements that are not shown. For example, the information processing device 20 may be provided with a speaker for outputting effect sound of the game and sound and voice of the virtual character.

Next, functions of the HMD 10 will be described. In the illustrated embodiment, various functions of the HMD 10 are realized by executing computer readable instructions using the computer processor 21 of the information processing device 20. The instructions executed using the computer processor 21 include instructions included in the game processing program according to an embodiment.

By executing the game processing program according to the embodiment using the computer processor 21, the game having the first mode and the second mode different from the first mode is realized in the game processing system 1. The game realized in the game processing system 1 may further have a mode other than the first mode and the second mode.

In the first mode of the game realized in the game processing system 1, processing relating to the game is performed based on first detection information obtained by the information processing device 20 when the HMD 10 is not mounted on the player 5, that is, when the information processing device 20 is detached from the attachment 11. The first detection information includes information concerning a touch operation of the player 5 detected via the touch-screen panel 24b of the information processing device 20, information concerning voice of the player detected by the sound collector 26, and any other detection information that can be detected in the information processing device 20 when the HMD 10 is not attached to the player 5. In the first mode, the player 5 is able to perform operations relating to the game using the information processing device 20 that is removed from the attachment 11. Since the first mode is designed to play the game when the HMD 10 is not mounted on the player 5, it is possible to display a non-stereoscopic image on the display 24.

In the second mode of the game realized in the game processing system 1, the game is played and progresses using second detection information obtained by the HMD 10 attached to the head of the player 5. The second detection information is, for example, detection information obtained by the sensor unit 25. Based on the second detection information, head tracking information for determining the orientation of the head of the player 5 is calculated. The head tracking information may be information indicating the position of the head of the player 5 in addition to the orientation of the head of the player 5. A process for advancing the game in the second mode may be performed based on, for example, the head tracking information calculated based on the second detection information. The process for advancing the game in the second mode may be performed using any other information in addition to the head tracking information. In preparation for playing the game in the second mode, the player 5 attaches the information processing device 20 to the attachment 11, and places the attachment 11 with the information processing device 20 on his/her head. As described above, the second mode is designed such that the game is played while the HMD 10 is worn by the player 5, so in one embodiment, a stereoscopic image that is stereoscopically viewed by the player 5 is displayed on the display 24 in the second mode. The stereoscopic image is displayed on the display 24 by, for example, a parallax barrier method. In the parallax barrier method, a left eye image and a right eye image are displayed on the display 24. The stereoscopic image is a set of images including the left eye image and the right eye image configured to be stereoscopically viewed when displayed on the display utilizing the parallax of the left and right eyes.

The first mode is, for example, a chat mode. The chat mode is an example of the first mode. The chat mode provides a function that allows the player to chat with a virtual character via a text message. In the first mode, the player can experience interaction with a virtual character by chatting with the virtual character. Processes performed in the chat mode will be described later in detail. Here, the interaction means, in a broad sense, that the virtual character reacts to an action performed by the player. The interaction with the virtual character includes an interaction performed as communication with the virtual character such as conversation with the virtual character. In this specification, an interaction performed as communication with a virtual character may also referred to as a communicative interaction. In addition to the communicative interaction, the interaction with a virtual character may include a battle against the virtual character, a cooperative play to play the game in cooperation with the virtual character, and interaction with other virtual characters. In this specification, an interaction performed as a battle against a virtual character may be referred to as a battle interaction. In the specification, an interaction performed as a cooperative play with a virtual character may be referred to as a cooperative interaction.

The second mode is, for example, the VR mode. The VR mode provides a function that allows the player to perform various interactions with a virtual character, which is a non-player character appearing in the virtual space displayed on the display of the information processing 20. Processes performed in the VR mode will be described later in detail. The VR mode is an example of the second mode, and the second mode may include any game mode in which a process for advancing the game using the head tracking information is performed.

In one embodiment, a game having the first mode and the second mode that is realized by the game processing system 1, may be a game in which a player performs interactions with a virtual character other than the communicative interaction. In the game realized by the game processing system 1, the communicative interaction may not be performed. The game according to one embodiment is played in a two-dimensional space in the first mode and played in a three-dimensional space in the second mode. The game according to one embodiment is played in a three-dimensional space in the first mode. Whereas in the second mode, the game is played in a three-dimensional space displayed in a display mode different from the three-dimensional space of the first mode (or in a three-dimensional space configured in a manner different from the three-dimensional space of the first mode). In one embodiment, the game realized by the game processing system 1 may use a game content(s) common to the first mode and the second mode. A parameter associated with the game content may be carried over to/from the first mode from/to the second mode. For example, when a value of the parameter of the specific game content is changed during playing the game in the first mode and thereafter the game shifts to the second mode, the specific game content with the changed parameter is used in the second mode. In one embodiment, a value of a parameter of a specific game content may be changed when the game is switched from the first mode to the second mode and/or when the game is switched from the second mode to the first mode. The parameter change of the game content may be a change that is advantageous for the player 5 to progress in the game or may be a change that is disadvantageous for the player 5. In one embodiment, a game play result in the first mode may be reflected in the game played in the second mode, and a play result in the second mode may be reflected in the game played in the first mode. For example, experience points of the player 5 acquired in the first mode may be carried over to the second mode.

As described above, the first mode and the second mode of the game realized in the game processing system 1 are distinguished from each other. That is, the first mode is different from the second mode. In one embodiment, when the game implemented in the game processing system 1 is played in the first mode, the HMD 10 is not attached to the head of the player 5. Whereas when the game is played in the second mode, the HMD 10 is attached to the head of the head of the player 5. In this case, in the first mode, the game is processed based on the first detection information obtained by the information processing device 20 that is not attached to the head of the player 5. Whereas in the second mode, the game is processed based on the second detection information obtained by the HMD 10 that is attached to the head of the player 5.

In one embodiment, a stereoscopic image is displayed on the display 24 in the second mode, whereas in the first mode, a non-stereoscopic image is displayed on the display 24 as described above. At least an image of a virtual character among the images used in the game is displayed as a stereoscopic image in the second mode. Whereas in the first mode, the image of the virtual character is displayed as the non-stereoscopic image.

In one embodiment, a process of advancing the game is performed without using the head tracking information calculated based on the second detection information in the first mode. Whereas in the second mode, a process of advancing the game is performed based on the head tracking information.

In one embodiment, the process of advancing the game is performed in accordance with a touch operation detected via the touch-screen panel 24b in the first mode. Whereas in the second mode, the process is not performed in accordance with the touch operation on the touch-screen panel 24b.

In one embodiment, in the case where an interaction with a virtual character is provided in a game implemented in the game processing system 1, the interaction with the virtual character is provided based on the first detection information obtained by the information processing device 20 that is not attached to the head of the player 5 in the first mode. In the second mode, the interaction with the virtual character is provided based on the second detection information obtained by the HMD 10 attached to the head of the player 5.

Figure 5:
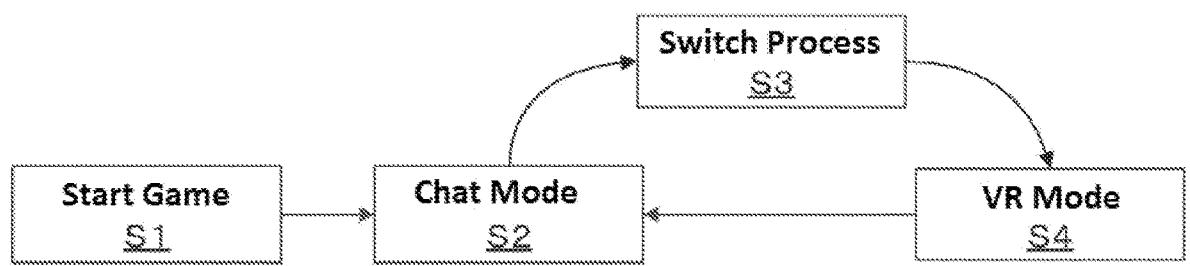
FIG. 5 is a diagram illustrating a mode switch in the game processed by the game processing system according to an embodiment.

After the game is started, it is possible to switch between the first mode and the second mode which are distinguished as described above. With reference to FIG. 5, the outline of the mode switch of the game processed by the game processing system 1 will be described. As shown in FIG. 5, when the game is started in step S1, the chat mode, which is the first mode, is started in step S2. In this chat mode, when a switching process for switching to the VR mode which is the second mode is initiated, the process shifts to step S3 and the switching process to the second mode is carried out. When the switching process is completed, the VR mode, which is the second mode, is started in step S4. When the VR mode is terminated or interrupted, a return process to the chat mode is performed.

Functions realized by the computer processor 21 will be now described more specifically. The computer processor 21 functions as a chat mode execution unit 21a, a switch processing unit 21b, a VR mode execution unit 21c, and a parameter management unit 21d by executing computer readable instructions included in the game processing program. At least some of the functions that can be realized by the computer processor 21 may be realized by a computer processor other than the computer processor 21 of the game system 1. For example, at least some of the functions realized by the computer processor 21 may be realized by a computer processor mounted on the server 50.

The chat mode execution unit 21*a* performs processing for providing the game in the chat mode as the first mode by executing a game processing program according to an embodiment. The chat mode executing unit 21*a* implements a function that allows the player 5 (or a character of the player 5) to chat with a virtual character that is the non-player character. After the player 5 logs in to the chat mode, the chat mode execution unit 21*a* displays a message from the virtual character and a message input or selected by the player 5 on the display 24, and enables the player 5 to chat with the virtual character. The chat mode execution unit 21*a* may display, following the message from the virtual character, several response alternatives for the player 5 to respond to the message on the display 24. One alternative is selected from the response alternatives according to an operation of the player 5 and a message corresponding to the selected response is displayed on the display 24 as a message from the player 5. The player 5 can select a desired one of the displayed response alternatives by touching the touch-screen panel 24*b*. The message from the virtual character and the response alternatives for the player to respond to the message can be specified by referring to the chat data 28*b* in accordance with the game processing program. The message from the virtual character may be displayed together with an image of the virtual character, and the message from the player 5 may be displayed together with an image of the player 5. The message from the virtual character may includes a message for prompting the player to switch to the VR mode which is the second mode, a message for allowing the player 5 to select an option(s) for setting of the VR mode, and any other message associated with the VR mode.

In the chat mode, a switch start object for starting switching to the VR mode as the second mode is displayed in accordance with the progress of the chat. Display of the switch start object is performed in accordance with the game processing program when the mode switch condition is satisfied. The chat mode execution unit 21*a* is capable of detecting that the switch start object is selected based on a detection signal from the touch-screen panel 24*b* or any other user interface. When it is detected that the switch start object has been selected, the process for switching to the VR mode, which is the second mode, is started.

The switch processing unit 21*b* performs the process for switching from the first mode to the second mode. The switch process includes displaying guidance on the display 24 to prompt a player to attach the information processing device 20 to the attachment 11, and displaying the switch object on the display 24 such that it is selectable by the player's gazing. After displaying the switch object, the switch processing unit 21*b* receives a detection signal from the sensor unit 25 or another sensor and determines whether the switch object has been selected by gazing based on the detection signal. For the determination, the switch processing unit 21*b* calculates the position and orientation of the HMD 10 based on the detection signal from the sensor unit 25, and specifies the position (point) at which the player 5 gazes based on the calculated position and orientation of the HMD 10. The gazing point can be specified by various known methods. For example, the gazing point may be specified based on the detection signal of the eye tracking sensor. For example, the switch processing unit 21*b* measures the duration of time (gazing duration) during which the gazing point is on the switch start object, and when the gazing duration reaches a predetermined length, the switch processing unit 21*b* determines that the selection of the switch start object has been completed. After the switch processing unit 21*b* determines that the selection of the switch object has been completed, it starts the VR mode which is the second mode.

The VR mode execution unit 21*c* displays an image of the virtual character in the virtual space in accordance with the game processing program and realizes interactions between the virtual character and the player 5. The VR mode execution unit 21*c* serves as a scene selection unit 21*c*1, a detection unit 21*c*2, an action determination unit 21*c*3, an image generation unit 21*c*4, and a suspension determination unit 21*c*5 when the game processing program according to one embodiment is executed by the processor 21.

The scene selection unit 21*c*1 selects a game scene to be executed based on the scenario data 28*c* and other information as required. After logging in to the VR mode, the scene selection unit 21*c*1 selects the opening scene. After the opening scene is executed, the scene selection unit 21*c*1 selects a next scene to be executed based on the detection information provided by the HMD 10, information stored in the storage 27 (for example, the parameter data 28*d*), and, any other information as necessary.

The detection unit 21*c*2 calculates the head tracking information for determining at least one of the orientation or the position of the HMD 10 based on the detection signal from the sensor unit 25 of the HMD 10. The head tracking information is information indicating at least one of the orientation or the position of the HMD 10. The head tracking information is determined based on the detection information from the sensor unit 25. More specifically, the head tracking information is obtained such that the position and orientation of the HMD 10 mounted on the head are calculated as the position in the three-dimensional orthogonal coordinate system and the angle around each axis. The three-dimensional orthogonal coordinate system is, for example, an orthogonal coordinate system composed of a roll axis along the front-rear direction, a yaw axis along the vertical direction, and a pitch axis along the left-right direction. The detection unit 21*c*2 generates a virtual space depending on at least one of the determined position or orientation of the HMD 10 and outputs image information for depicting the virtual space to the display 24. For example, the detection unit 21*c*2 can calculate the gazing direction or the gazing point based on at least one of the position or the orientation of the HMD 10.

The action determination unit 21*c*3 determines an action of the player 5 using the HMD 10 based on the head tracking information. Moreover, the action determination unit 21*c*3 may specify an action (reaction) of the virtual character in the virtual space according to the determined action of the player 5. The actions of the player 5 wearing the HMD 10 include nodding, shaking his/her head, any other motions of the head, and eye movements. The action of the player 5 that causes the virtual character to make a reaction may include the player's eye movement. Such eye movement can be detected by the eye tracking sensor included in the sensor unit 25.

The image generation unit 21*c*4 generates image information for a depicting area in the virtual space. The depicting area is determined by an angle of view or the like around the gazing point or gazing direction determined by the detection unit 21*c*2. Based on the image information generated in this way, the image for the depicting area of the virtual space is displayed on the display 24. For the generation of the image information, for example, the image data 28a, the scenario data 28c, the parameter data 28d, the game progress data 28f, and other data stored in the storage 27 may be used. When a virtual character appears in the depicting area, the image generation unit 21c4 generates image information of the virtual space including the virtual character performing the action specified by the action determination unit 21c3, and the image generated in this manner is rendered on the display 24 as a stereoscopic image. In this way, an image of the virtual space including the image of the virtual character performing the action specified in response to the action of the player 5 is displayed on the display 24. The image generation unit 21c4 may generate audio information corresponding to the action of the virtual character and the depicting area of the virtual space. The audio information is output to the speaker of the HMD 10.

Based on the suspension condition data 28e, the suspension determination unit 21c5 determines whether the suspension condition is satisfied. For example, in a case where the suspension condition is that the prohibited area set in the virtual space is gazed, the suspension determination unit 21c5 determines the gazing point of the player 5 in the virtual space based on the detection information obtained by the HMD 10 and determines whether this gazing point is within the prohibited area. When the gazing point of the player 5 is within the prohibited area, it is determined that the suspension condition is satisfied.

In a case where the suspension condition is that the player 5 performs the same action three or more times toward the virtual character, the suspension determination unit 21c5 refers to the game progress data 28f to retrieve the previous two actions that the player 5 performed toward the virtual character, and determines whether the previous two actions are the same or different. When the previous two actions are the same, the suspension determination unit 21c5 determines whether the last action determined in the action determination unit 21c3 is same as the previous two actions. If the last action is the same as the previous two actions, it is determined that the suspension condition is established.

In a case where the suspension condition is that the player 5 performs an action on the head of the virtual character three times or more, the suspension determination unit 21c5 refers to the game progress data 28f to determine whether the number of the actions performed on the head of the virtual character has reached three times with the last action. When the last action on the head of the virtual character is counted as the third time, it is determined that the suspension condition is satisfied.

In a case where the suspension condition is that the banned action has been performed by the player, the suspension determination unit 21c5 determines whether the last action falls under the banned action. The banned action may include the player's moving his/her head with an acceleration equal to or greater than a predetermined upper limit value. In a case where the banned action is moving the head with an acceleration equal to or greater than a predetermined value, the suspension determination unit 21c5 determines whether the acceleration detected by the sensor unit 25 is equal to or more than the upper limit value. When the detected acceleration is equal to or more than the upper limit value, it is determined that the suspension condition is satisfied. Whereas when the acceleration is less than the upper limit value, it is determined that the suspension condition is not satisfied.

In a case where the suspension condition is that a parameter included in the parameter data 28d is equal to or larger than a predetermined threshold value or smaller than a predetermined threshold value, the suspension determination unit 21c5 refers to the parameter data 28d and determines whether the suspension condition is satisfied. In a case where the parameter is a parameter representing the favorability of the virtual character with respect to the user character and the suspension condition is that the parameter indicating the favorability is equal to or less than a predetermined threshold value, the suspension determination unit 21c5 retrieves the parameter indicating the favorability from the storage 27 and determines whether the parameter indicating the favorability is equal to or less than the predetermined threshold value. When the parameter indicating the favorability is equal to or less than the predetermined threshold value, it is determined that the suspension condition is satisfied, whereas when it is larger than the predetermined threshold value, it is determined that the suspension condition is not satisfied.

The suspension determination unit 21c5 is able to determine whether the suspension condition is satisfied at any point in time while the game is being executed. In one embodiment, the suspension determination unit 21c5 may determine whether the suspension condition is satisfied when the player 5 performs an action toward the virtual character.

As described above, a motion image in which a virtual character moves in the virtual space is displayed on the display 24 by the VR mode execution unit 21c, and voice and sound corresponding to the movement of the virtual character is output from the speaker. For example, when the virtual character speaks to the player 5, a motion image in which the head and mouth of the virtual character move is displayed on the display 24, and voice corresponding to words which the virtual character speaks is output from the speaker. In one embodiment, the virtual character interacting with the player 5 in each of the VR mode and the chat mode are the same virtual character. For example, a virtual character appearing in the VR mode has the same name as a virtual character appearing in the chat mode, and they have common appearance such that it can be recognized as the same character. It should be noted that the image of the virtual character is displayed as a stereoscopic image in the VR mode whereas the image of the virtual character is displayed as a non-stereoscopic image in the chat mode, so that the images of the virtual character are different between the VR mode and the chat mode. However, such difference in representation format does not affect the identity of virtual characters.

The parameter management unit 21d updates the parameter data 28d as the game is progressed. When the game is provided in the first mode, the parameter management unit 21d updates the parameter data 28d according to the progress of the game in the first mode, and when the game is provided in the second mode, the parameter management unit 21d updates the parameter data 28d according to the progress of the game in the second mode.

In a case where the parameter data 28d includes a parameter indicating the favorability which the virtual character has with respect to the user character, the parameter management unit 21d may increase or decrease the value of the parameter depending on an action of the player 5 in the first mode and the second mode. When the first mode is the chat mode, the amount (for example, increase amount or decrease amount) or rate (increase rate or decrease rate) of change of favorability for each option of the message presented to the player 5 in the chat mode may be defined. In this case, the parameter management unit 21d specifies the change amount or change rate of the favorability depending on the message option selected by the player 5, and updates the parameter data 28d based on the specified change amount or change rate of the favorability. In the VR mode, the amount of change or the change rate of the favorability may be determined for each type of action that the player 5 makes. The parameter management unit 21d specifies the change amount or change rate of the favorability depending on the action of the player 5 and updates the parameter data 28d based on the specified change amount or change rate of the favorability.

When the second mode is the VR mode, a banned action may be defined for the actions that the player 5 performs in the VR mode. The banned actions may include player's moving his/her head with an acceleration equal to or greater than a predetermined value, glancing at the prohibited area in the virtual space, and repeating the same action for more than a predetermined number of times. In this specification, among actions that the player 5 does, actions other than the banned actions may also be referred to as normal actions. When the banned action is performed by the player 5, the parameter managing unit 21d updates the parameter data 28d so as to decrease the favorability. Whereas when the normal action is made by the player 5, the parameter management unit 21d updates the parameter data 28d so as to increases or decreases the favorability depending on the normal action.

When the game is being processed in the VR mode, the VR mode may be incidentally terminated abnormally without going through the ending scene prepared in the VR mode. For example, when the power supply to the HMD 10 is lost or when a function of the system program force-quits the game processing program, the VR mode may be terminated abnormally. When the VR mode is abnormally terminated, the parameter management unit 21d updates the parameter data 28d so as to decrease the favorability.

When a termination condition is satisfied, the VR mode execution unit 21c performs a termination process to terminate the VR mode. The termination condition may include, for example, that a predetermined duration of time (for example, one minute) has elapsed from the start of the VR mode, that an operation that is subjected to cause the termination has been detected, that the last event included in the scenario being executed in the VR mode has ended, and any other conditions. The termination process performed when the termination condition is satisfied may include, displaying, on the display 24, guidance for prompting the player to remove the information processing device 20 from the attachment 11, and displaying a login screen to log in to the chat mode which is the first mode.

Figure 6:
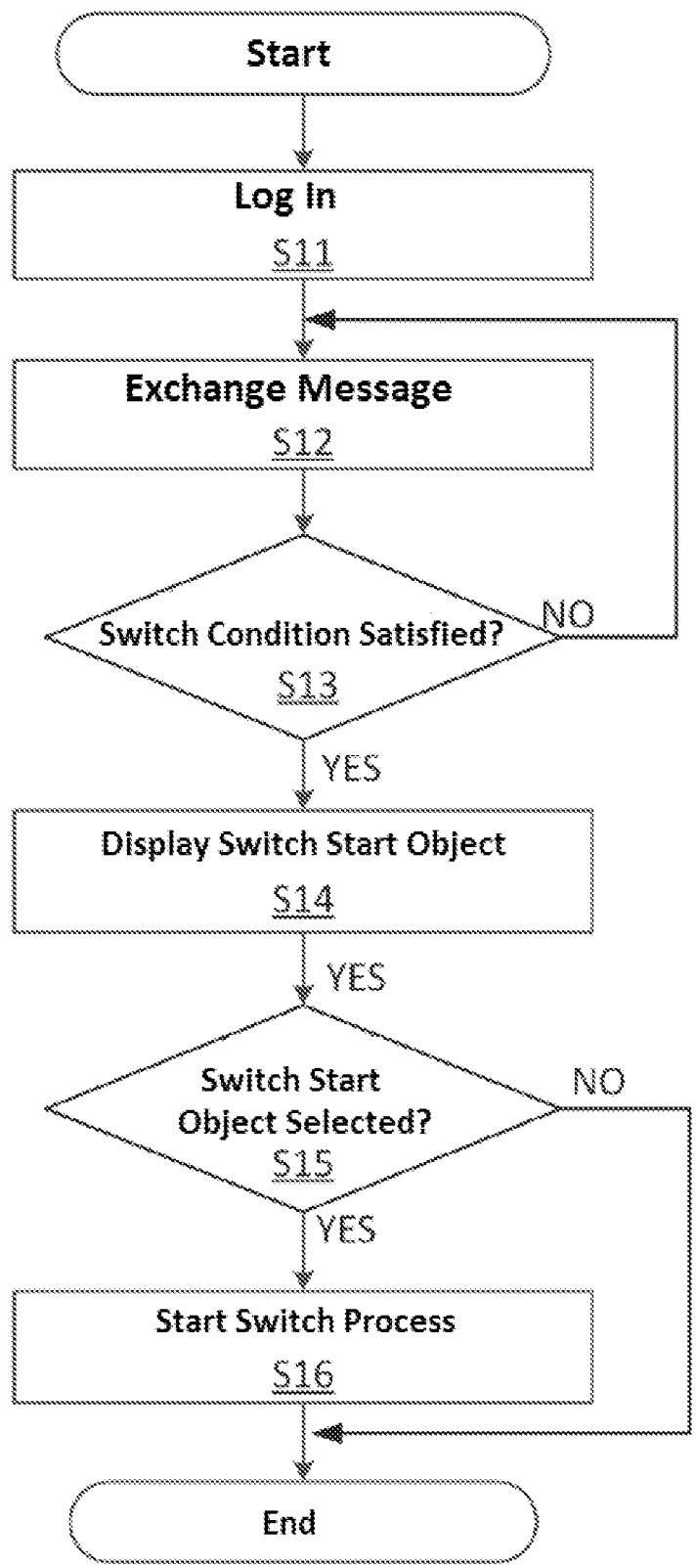
FIG. 6 is a flowchart of a process in a chat mode according to an embodiment.

Next, with reference to FIG. 6 and FIGS. 7a to 7d, a chat process in the chat mode will be described. FIG. 6 is a flowchart showing the flow of the process in the chat mode in one embodiment, and FIGS. 7a to 7d show examples of a display image in the chat mode. It is assumed that the HMD 10 is not mounted on the head of the player 5 and the information processing device 20 is detached from the attachment 11 at the start of the chat mode.

As described above, in the game processing system 1, the game is started in the chat mode. In step S11, a login screen for logging in to the chat mode is displayed on the display 24 of the information processing device 20. When the login process is performed by the player 5, the chat process proceeds to step S12.

Figure 7A:
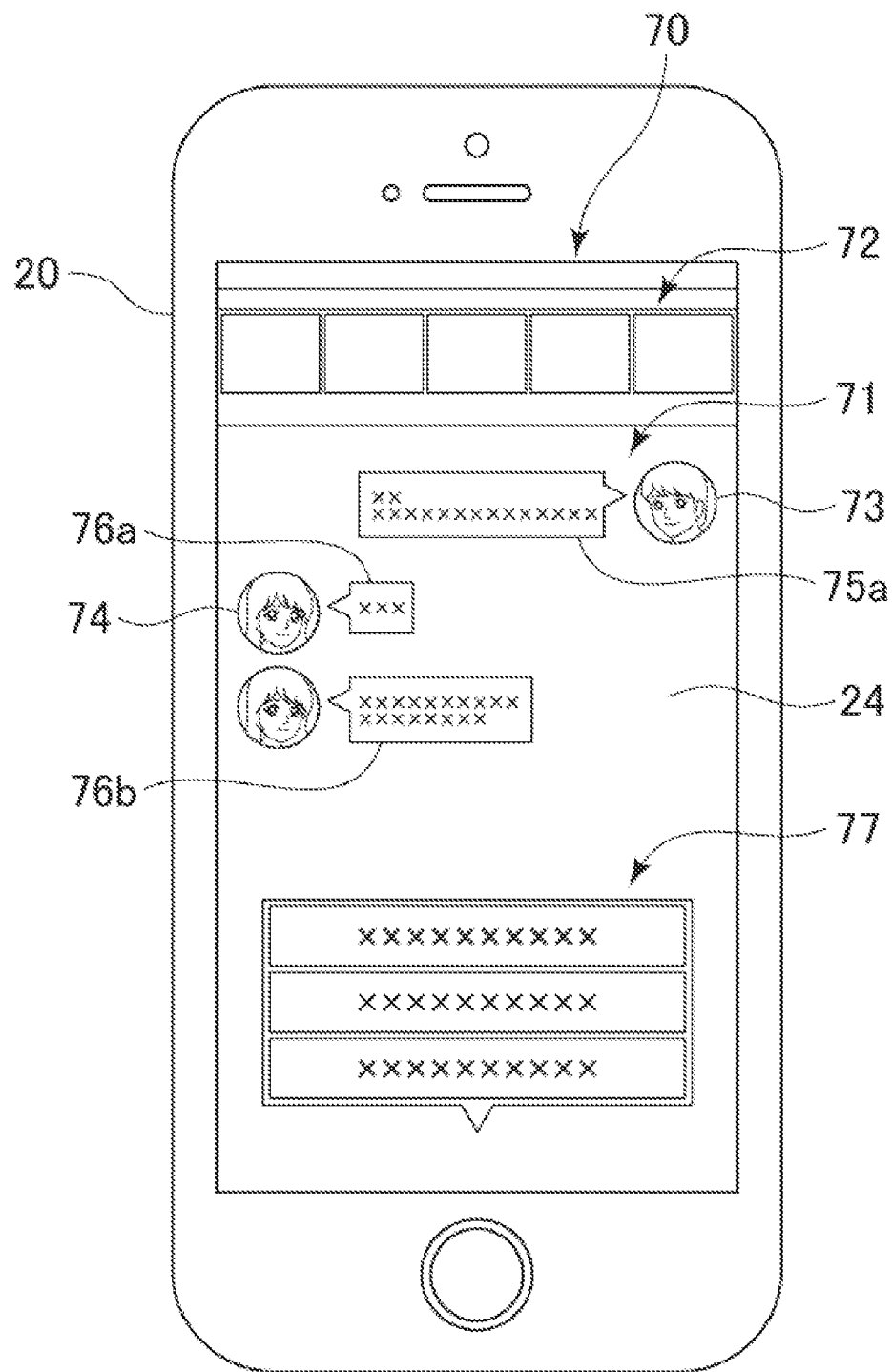
FIG. 7a shows an example of a display image in the chat mode according to an embodiment. The screen of FIG. 7a shows options of a message that the player is able to select.

In step S12, chatting is performed between the player 5 and the virtual character such that they exchange messages. More specifically, after logging into the chat mode, a chat display image for displaying a chat performed between the player 5 and the virtual character is generated, and the chat display image is displayed on the display 24. FIG. 7a shows a chat display image 70 which is an example of the chat display image displayed on the display 24. The chat display image 70 has a chat display area 71 including an icon 73 corresponding to the player 5, an icon 74 corresponding to the virtual character, a message 75a from the player 5, and messages 76a and 76b from the virtual character. In addition, the chat display image 70 has a menu area 72 arranged at the top of the chat display area 71. The virtual character's messages 76a and 76b are specified based on the chat data 28b and other data stored in the storage 72 in accordance with the game processing program. For example, messages of the virtual character are displayed sequentially from the message in the root node with reference to the chat data 28b defined in the form of the tree structure. At the branch point of the node, a node is selected depending on a branch condition and a message corresponding to the selected node is displayed.

In step S12, a parameter set for the player 5 may be increased or decreased depending the option selected by the player 5. As described above, the increase/decrease amount or change rate of the parameter is determined based on the change amount (for example, increase amount or decrease amount) or the change rate (increase rate or decrease rate) of the parameter determined for each option of the message. When the change amount or the change rate of the parameter is specified, the parameter data 28d is updated based on the specified change amount or change rate of the favorability.

Figure 7B:
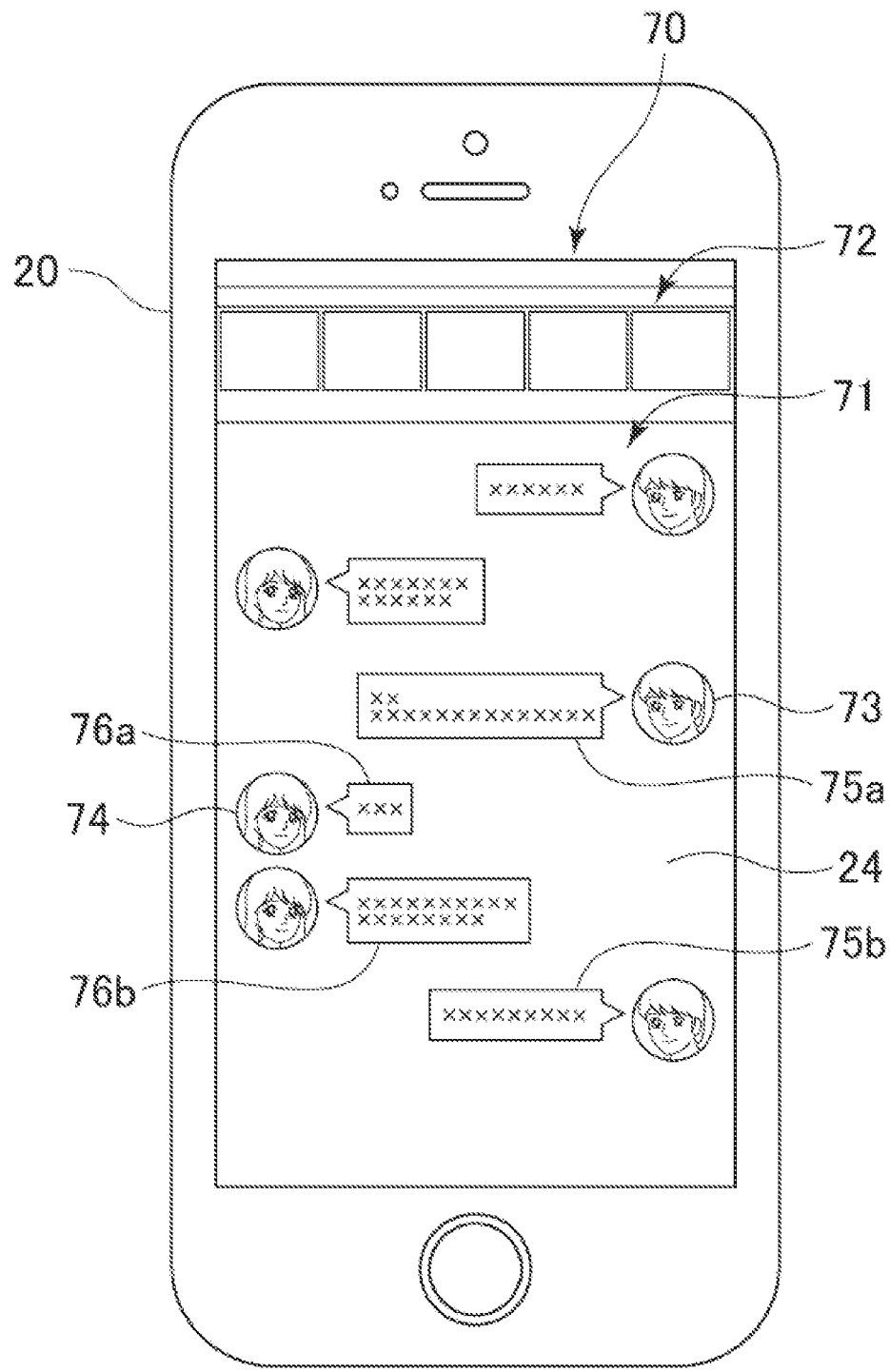
FIG. 7b shows an example of a display image in the chat mode according to an embodiment. The screen of FIG. 7b shows the message selected by the player.

The chat display image 70 in FIG. 7a includes a display showing options 77 of the message for the player 5 to select at the lower part of the chat display area 71. The player 5 is able to select one from among the displayed options 77. The selection is performed, for example, by touching an area where the option desired to be selected is displayed on the display 24 with a finger. Once the selection is made, a message 75b corresponding to the selected option is newly displayed in the chat display area 71 as a message from the player 5, as shown in FIG. 7b.

Figure 7C:
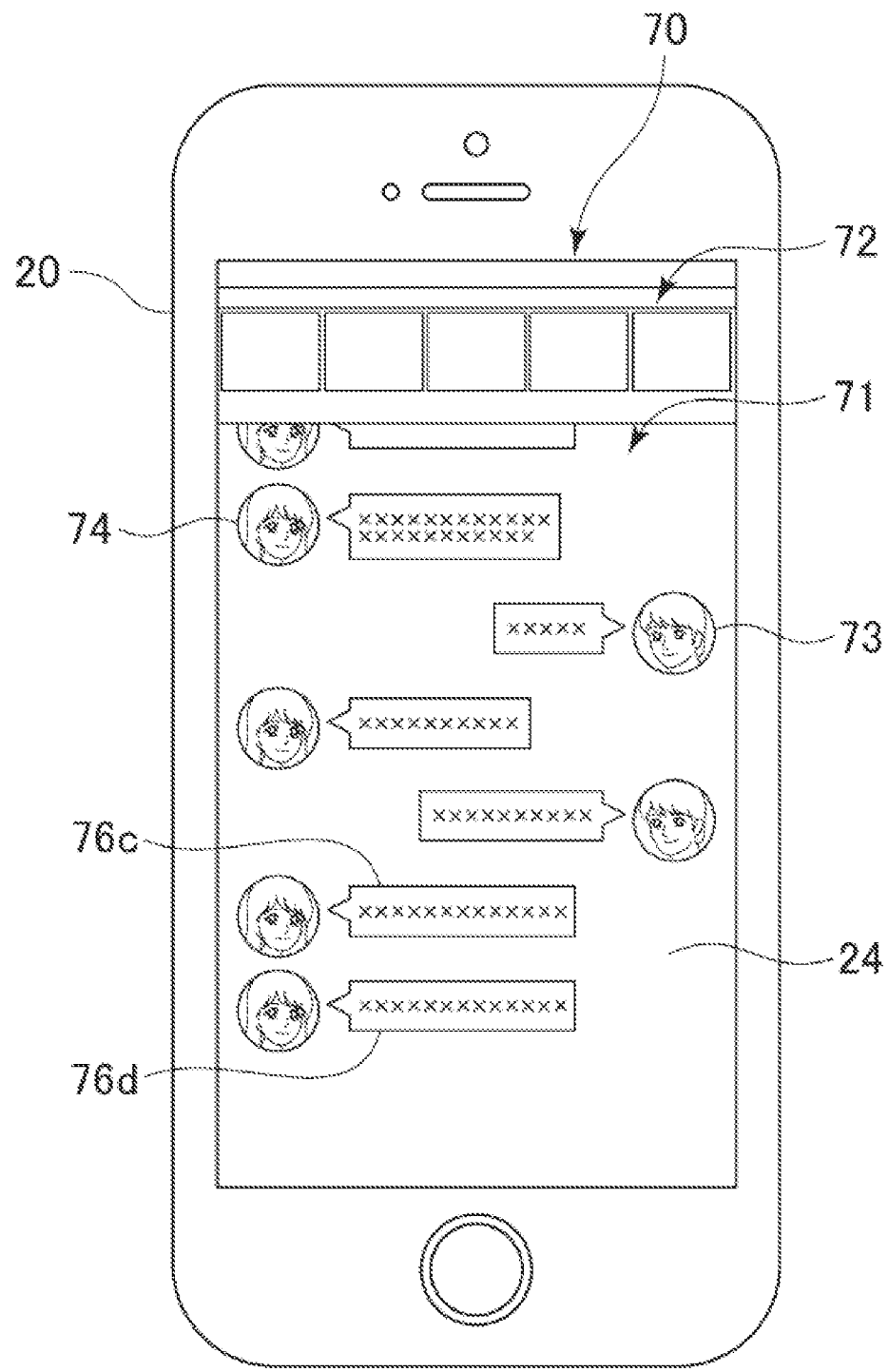
FIG. 7c shows an example of a display image in the chat mode according to an embodiment. The screen of FIG. 7c shows a message for prompting the player to switch to a VR mode, a message for selecting settings in the VR mode, and a message for selecting an item used in the VR mode.

In the course of the chat process, messages 76c and 76d for prompting the player to select settings in the second mode VR mode may be displayed as messages from the virtual character as shown in FIG. 7c. The message 76c is a message for prompting selection of a scenario in the VR mode, and the message 76d is a message for prompting selection of an item used by the virtual character in the VR mode (for example, clothes worn by the virtual character in the virtual space in the VR mode). In other words, the settings in the second mode include the scenario in the VR mode and the item used by the virtual character in the VR mode. After the message 76c prompting the selection of the scenario is displayed, choices of the scenario are displayed on the display 24. For example, first to fifth scenarios are displayed as the choices. The player 5 is able to select one scenario that he/she likes from among these choices. After the message 76d prompting selection of the item is displayed, choices of the item are displayed on the display 24. The player 5 can select one item that he/she likes from among the choices. In the course of the chat process, a message for prompting the player to switch to the second mode may be displayed as a message from the virtual character.

In step S13, it is determined whether the mode switch condition from the first mode to the second mode is satisfied or not. As the mode switch condition from the first mode to the second mode, for example, used is a condition that a predetermined duration of time (for example, one minute) has elapsed from the start of the chat mode. The elapsed time from the start of chat mode is measured using, for example, a system clock. The process returns to step S12 and the chat process is repeated until it is determined that the mode switch condition is satisfied. When it is determined that the mode switch condition is satisfied, the chat process proceeds to step S14.

Figure 7D:
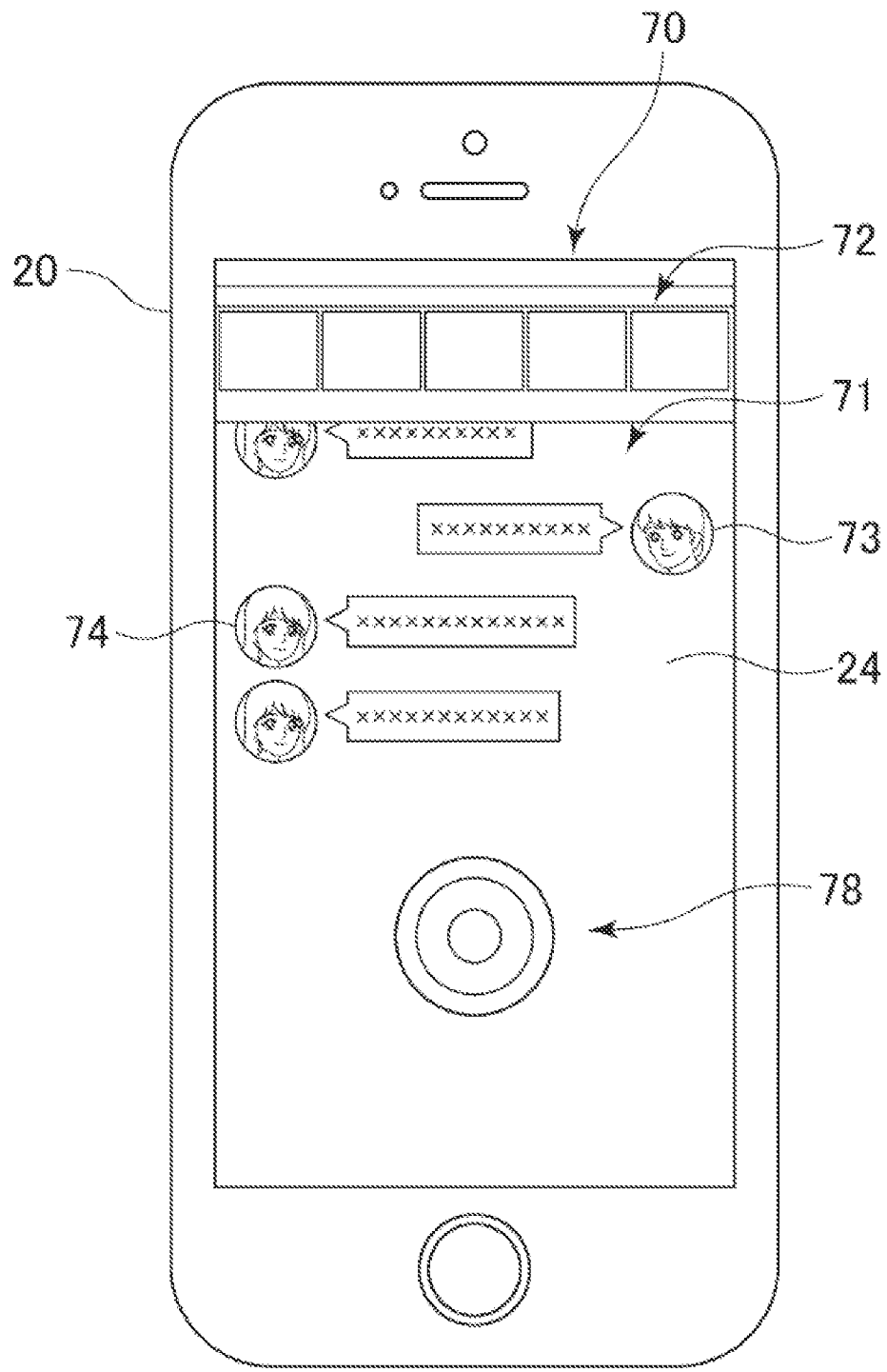
FIG. 7d shows an example of a display image in the chat mode according to an embodiment. The screen of FIG. 7d shows a switch start object.

In step S14, the switch start object 78 is displayed on the display 24, and the chat process proceeds to step S15. As shown in FIG. 7d, the switch start object 78 is displayed as, for example, an object having a circular profile in the chat display area 71. When it is confirmed that the switch start object 78 is selected in step S15, the chat process proceeds to step S16. Whereas when the selection of the switch start object 78 is not confirmed even after a predetermined duration of time (for example, 10 seconds) has elapsed since the switch start object 78 is displayed, it is determined that the switch start object has not been selected and the chat process is terminated. Alternatively, the process may return to step S12 and a process for resuming chatting may be performed when it is determined that the switch start object has not been selected. Whether the switch start object 78 is selected or not may be determined based on an operation performed on the touch-screen panel 24b. For example, when an operation (for example, a tap operation) to touch the touch-screen panel 24b at a position overlapping the display area of the switch start object 78 is detected via a detection signal of the touch-screen panel 24b, it is determined that the switch start object 78 is selected. Alternatively, the selection of the switch start object 78 may be made by a non-contact operation.

In step S16, a switch process to shift to the VR mode, which is the second mode, is initiated. Once the switch process is started, the chat process is terminated.

The above chat process is executed by, for example, the chat mode execution unit 21a. The chat mode execution unit 21a is capable of executing the above-described chat process alone or in cooperation with other functions as appropriate. In executing the chat process, in addition to the data stored in the storage 27, data stored in another storage, detection information obtained by various sensors, or data other than these may be used as required.

Figure 8:
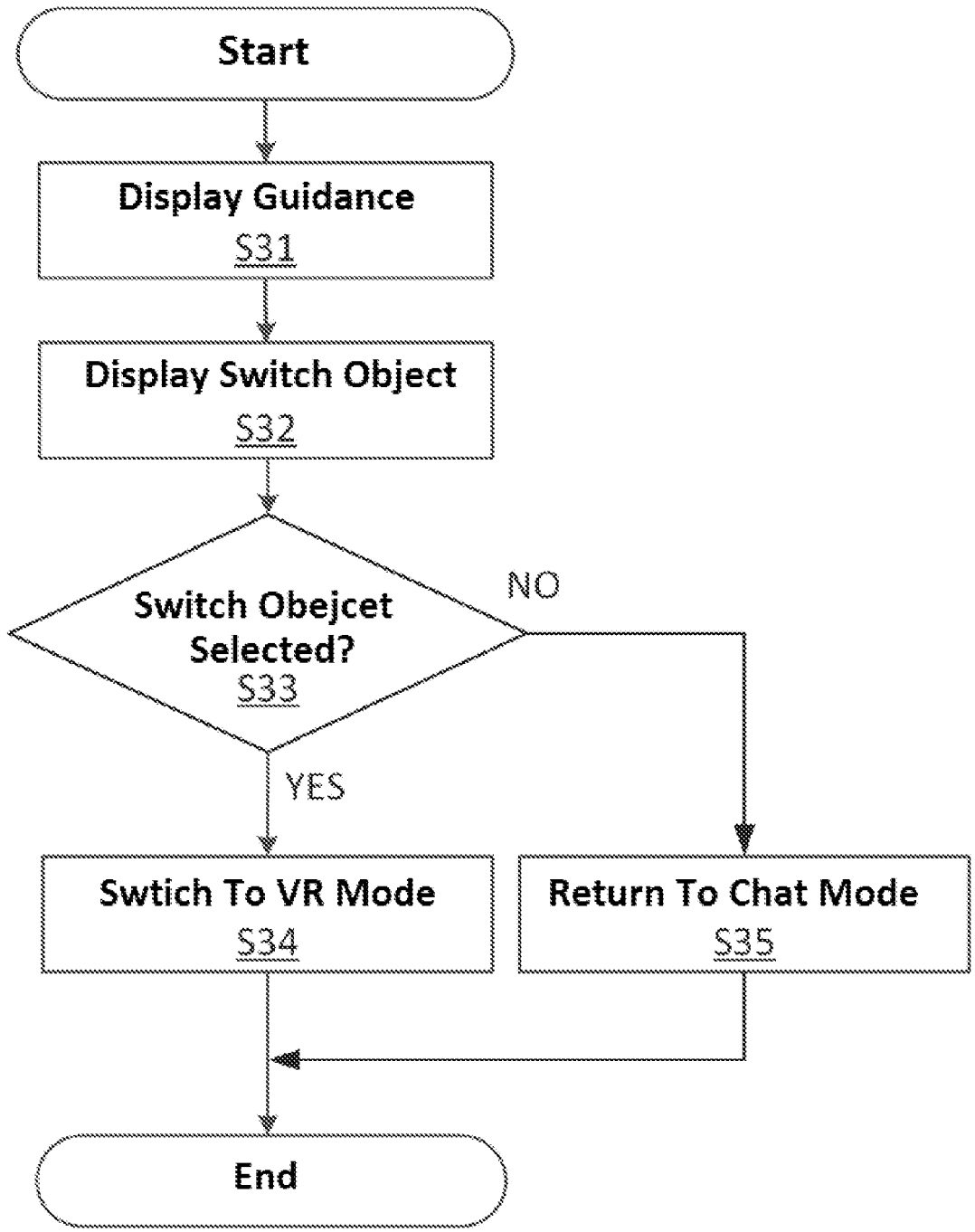
FIG. 8 is a flowchart of a mode switch process according to an embodiment.
Figure 9A:
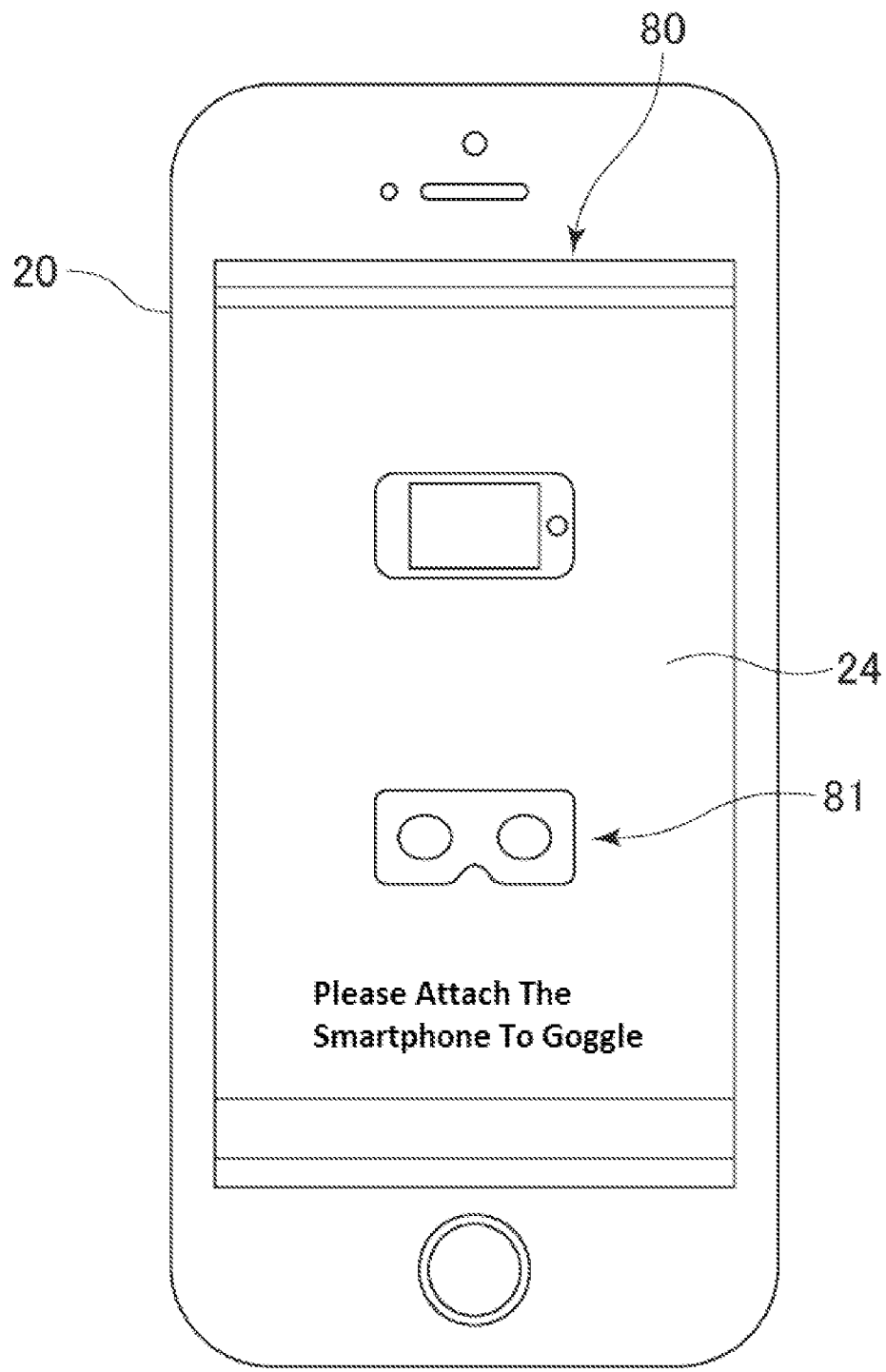
FIG. 9a shows an example of an image displayed in the mode switch process according to one embodiment. The screen of FIG. 9a shows guidance for prompting the player to attach a display to an attachment.
Figure 9B:
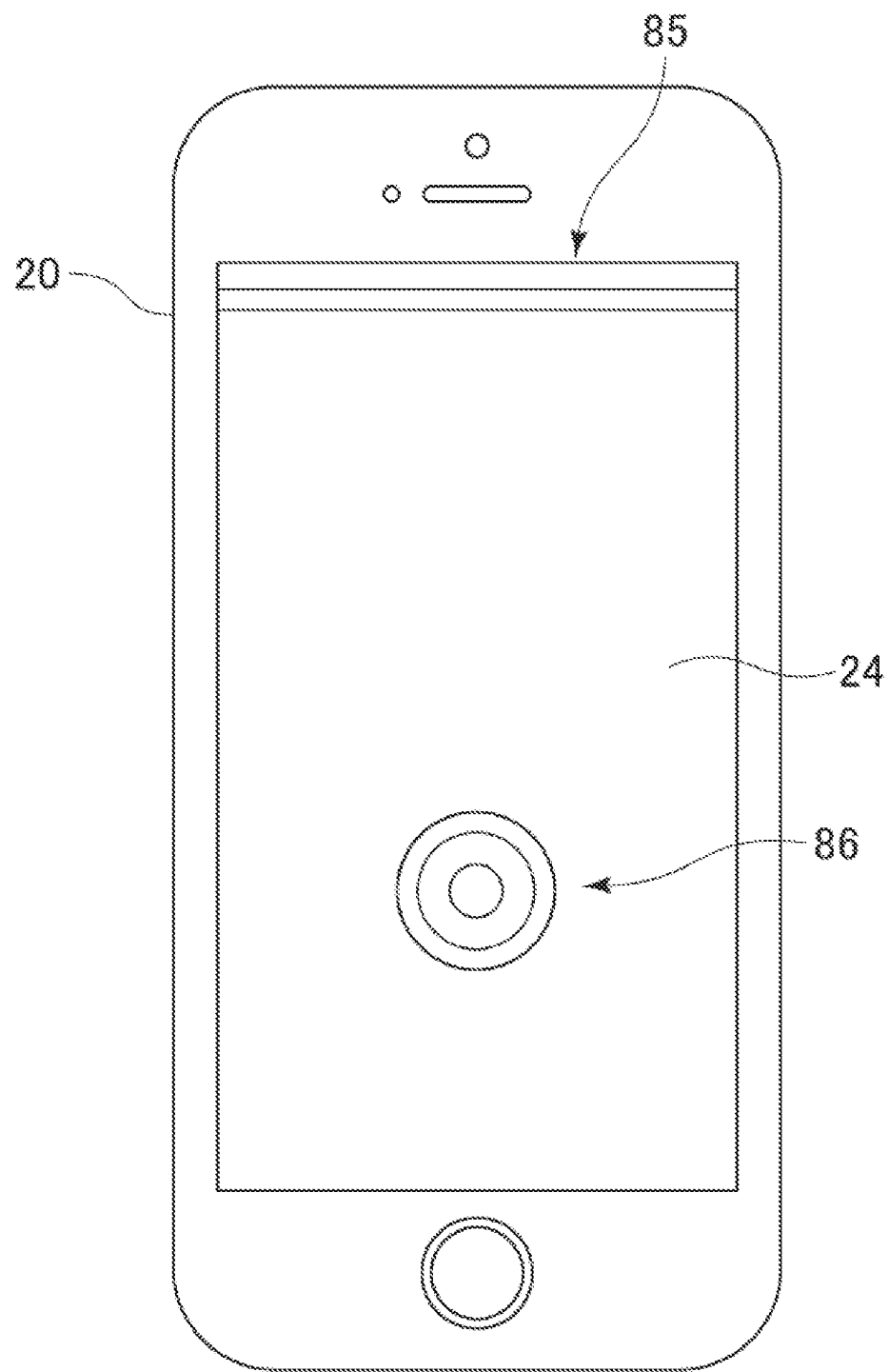
FIG. 9b shows an example of an image displayed in the switch process according to an embodiment. The screen of FIG. 9b shows a switch object.

The mode switch process from the chat mode as the first mode to the VR mode as the second mode will be now described with reference to FIG. 8 and FIGS. 9a and 9b. FIG. 8 is a flowchart of the mode switch process according to an embodiment.

When the switch process is started, a guidance that prompts the player to wear the HMD 10 is displayed on the display 24 of the information processing device 20 in step S31. A guidance display image 80 which is an example of the guidance display image including the guidance is shown in FIG. 9a. The guidance display image 80 includes a guidance prompting the player to attach the information processing device 20 to the attachment 11, a guidance prompting the player to wear the HMD 10 on the head, and any other various guidance necessary for starting the VR mode. The guidance display image 80 shown in FIG. 9a includes a guidance 81 prompting the player to attach the information processing device 20 to the attachment 11. This guidance may include instructions for attaching the information processing device 20 to the attachment 11. When a predetermined time has elapsed after displaying the guidance, the mode switch process proceeds to step S32.

In step S32, the switch object is displayed on the display 24. An example of the switch process image including the switch object is shown in FIG. 9b. In the switch process image 85 shown in FIG. 9b, a switch object 86 is included. The switch process image 85 may be displayed as a stereoscopic image. In one embodiment, the image displayed on the display 24 is switched from a non-stereoscopic image to a stereoscopic image at the start of the mode switch process or at a predetermined timing after the start of the mode switch process. For example, the image displayed in the chat mode is displayed as a non-stereoscopic image, and the image displayed after the switch process has started is displayed as a stereoscopic image.

Next, in step S33, it is determined whether selection of the switch object 86 is completed. The switch object 86 is selected, for example, by the player 5 by gazing at the object for a predetermined duration of time. Therefore, in order to select the switch object 86 in this state, the player 5 is required to wear the HMD 10. In one embodiment, whether the selection of the switch object 86 is completed is determined based on whether the gazing point calculated based on the detection signal from the HMD 10 is situated on the switch object 86 for a predetermined amount of time or more. The gazing point may be calculated based on information detected by the sensor unit 25 provided in the HMD 10 as described above. The above determination can be made by measuring a duration of time in which the gazing point stays on the switch object 86 using the system clock and determining whether the measured gazing time has reached the predetermined amount of time. For example, when the gazing time reaches the predetermined amount of time, it is determined that selection of the switch object 86 is completed, and the mode switch process proceeds to step S34. Whereas when completion of the selection of the switch object 86 is not detected even after a predetermined amount of time has elapsed since the switch object 86 is displayed, it is determined that the selection of the switch object 86 has not been completed the mode switch process proceeds to step S35.

In step S34, the VR mode, which is the second mode, is initiated. Processes performed in the VR mode will be described later in detail.

Since the switch to the VR mode has not been selected, a process for returning to the chat mode is initiated in step S35. When the returning process to the chat mode is completed, the chat mode is resumed. In the resumed chat mode, a message from the virtual character made based on the fact that the switch to the VR mode was not performed may be displayed.

The mode switch process described above is executed, for example, by the switch processing unit 21b. The switch processing unit 21b is capable of executing the mode switch process alone or in cooperation with other functions as needed.

Figure 10:
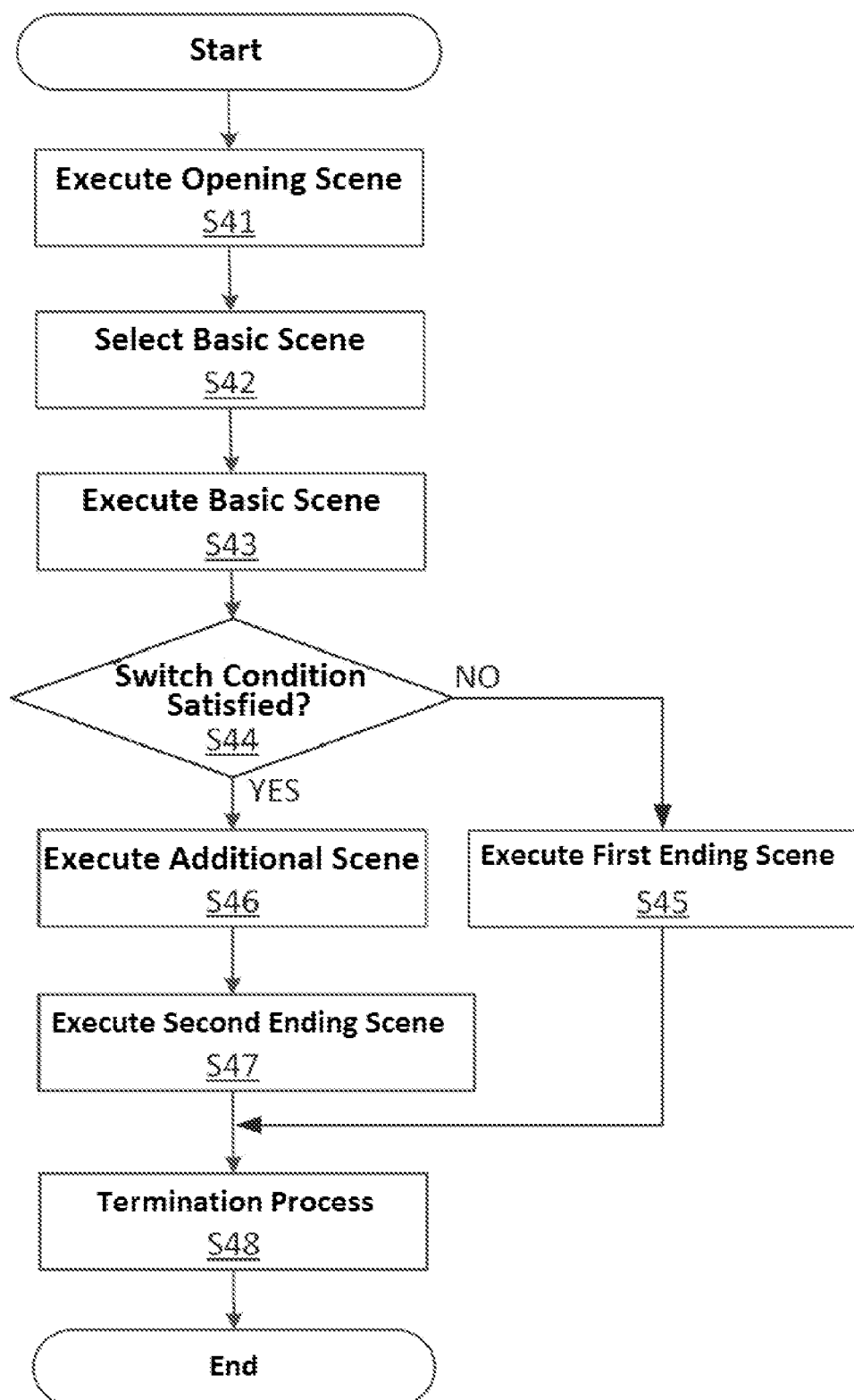
FIG. 10 is a flowchart of a process in the VR mode according to an embodiment.
Figure 11:
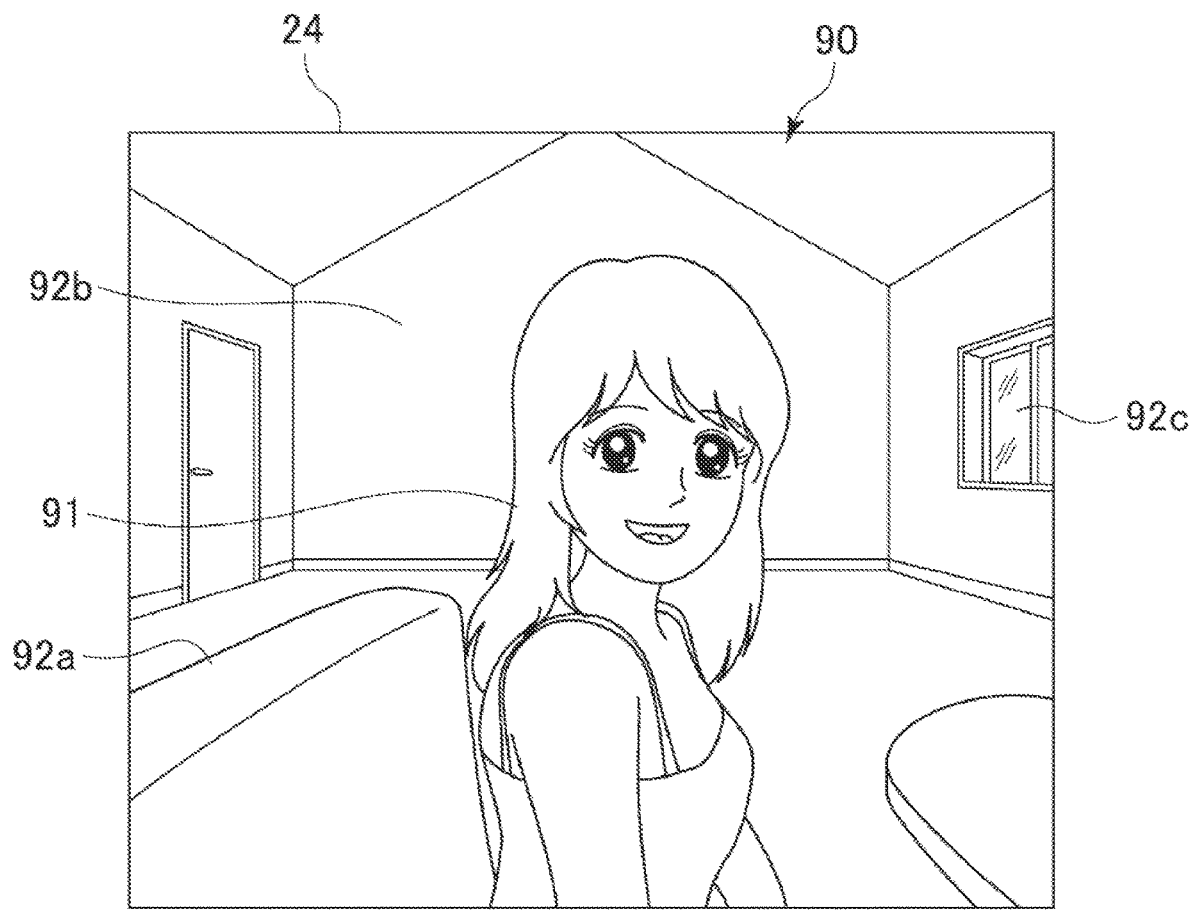
FIG. 11 shows an example of an image displayed in the VR mode according to one embodiment.
Figure 12:
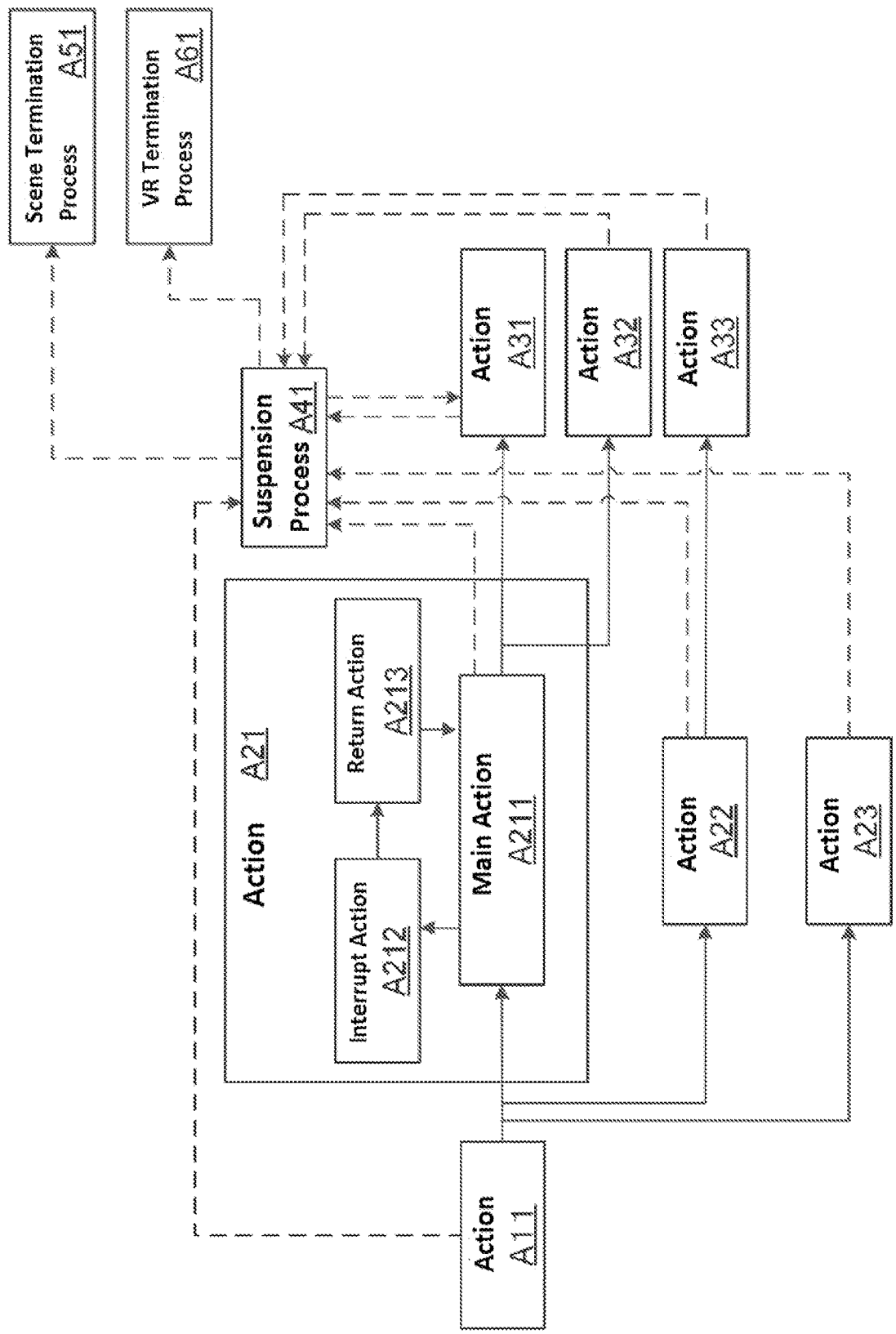
FIG. 12 schematically shows a flow of actions performed by a virtual character in a scene executed in the VR mode.

Next, a VR process in the VR mode will be described with reference to FIGS. 10 to 12. FIG. 10 is a flowchart showing the flow of the VR process in the VR mode in one embodiment, FIG. 11 shows an example of a display image in the VR mode, and FIG. 12 schematically illustrates the flow of actions of the virtual character in a scene being executed in the VR mode. As described above, in order to select the switch object 86 in the mode switch process, the player 5 wears the HMD 10. It is assumed that the HMD 10 is mounted on the head of the player 5 at the start of the VR mode. In the following, the VR process will be described on the premise that the first scenario is selected. In the VR process, the parameter data 28*d* is referred to when necessary. In one embodiment, the value of each parameter included in the parameter data 28*d* as of the start of the VR process is equal to the value of the corresponding parameter included in the parameter data 28*d* as of the end of the chat process. That is, the parameter data 28*d* updated in the chat process is used without modification in the VR process.

When the VR mode is started, the opening scene is executed in step S41. More specifically, image information of the virtual space corresponding to the opening scene is generated, and an image according to the image information is output to the display 24. In the opening scene, a predetermined action of the virtual character may be performed in the virtual space.

FIG. 11 shows an example of a VR image of the opening scene displayed on the display 24. A VR image 90 shown in FIG. 11 includes a virtual character image 91 representing the virtual character, images 92*a* to 92*c* representing objects corresponding to the backgrounds, and images of various objects other than these. The VR image 90 is an image corresponding to a predetermined range of the virtual space for the first scenario. The range of the virtual space corresponding to the VR image 90 may be specified as a range determined by an angle of view around the gazing point in the virtual space calculated based on the orientation of the HMD 10. The image data 28*a* is used to generate the image information. The VR image 90 and other images displayed in the VR mode are displayed as stereoscopic images.

For example, the virtual character image 91 is able to perform an action specified by opening scene data A1 in the virtual space. For example, the action that the virtual character image 91 performs may include, talking to the player 5 (toward the position of the player 5 in the virtual space), traveling in the virtual space, picking up an object placed in the virtual space, and any other various motions in the virtual space.

A series of actions performed by the virtual character in the opening scene will be described with reference to FIG. 12. FIG. 12 schematically illustrates a flow of the actions performed by the virtual character in a scene executed in the VR mode. FIG. 12 illustrates the flow of actions in the opening scene. As shown in FIG. 12, the virtual character first performs an action corresponding to an action A11 in the opening scene. The action A11 corresponds to an action that the virtual character can perform in the opening scene.

The action A11 is defined as an action that may branch. More specifically, the action A11 branches to an action A21, an action A22, and an action A23. For example, in the action A11, a first switch condition for switching to the action A21, a second switch condition for switching to the action A22, and a third switch condition for switching to the action A23 are set. When the first switch condition is satisfied, the action of the virtual character is switched to the action A21. When the second switch condition is satisfied, the action of the virtual character is switched to the action A22. When the third switch condition is satisfied, the action of the virtual character is switched to the action A23. At least one of the first, second, and third switch conditions may be that the favorability of the virtual character with respect to the user character is equal to or greater than a predetermined threshold value.

Various conditions may be set as the first switch condition, the second switch condition, and the third switch condition. For example, the first switch condition, the second switch condition, and the third switch condition may include that the action prescribed as action A11 has ended, that the player 5 performs a predetermined action (for example, the player 5 gazes at a predetermined part of the virtual character) toward the virtual character, and that the player 5 answers a question from the virtual character. The first switch condition, the second switch condition, and the third switch condition are different from each other. The player 5 can answer the question from the virtual character by nodding, shaking his/her head, or other head motions. More specifically, when a question is made by the virtual character and the player makes action by moving his/her head, the movement of the head is detected by the sensor unit 25 of the HMD 10 and the answer of the player 5 is identified based on the detected movement of the head. For example, when a nodding motion is detected, it may be determined that the player 5 has made a positive answer. Whereas when a motion of shaking his/her head is detected, it may be determined that the player 5 has made a negative answer. Further, when a motion of the head of the player 5 is not detected for a predetermined duration of time after the question is made by the virtual character, it may be determined that the player 5 does not answer the question from the virtual character. The action of the player 5 may be determined by a function of the action determination unit 21*c*3.

The action A21 further branches to an action A31 and an action A32. When a predetermined switch condition is satisfied in the action A21, switching from the action A21 to the action A31 or the action A32 is performed depending on the established switch condition. Only the action A33 is associated with the action A22 in the lower layer. That is, the action A22 is not branched. In this case, when the action A22 ends, the action A33 is started. No more action is defined below the action A23. The structure of the actions shown in FIG. 12 is an example, and the types and the number of actions included in each scene and the structure of the actions may be set appropriately according to a story to be realized in the scene.

The actions A11, A21 to A23, and A31 to A33 may be actions in which the virtual character talks to the player 5 about a predetermined topic. Actions that the virtual character makes in the actions A11, A21 to A23, and A31 to A33 respectively may be specified based on the opening scene data A1. The opening scene data A1 includes data defining actions that the virtual character performs in the actions A11, A21 to A23, and A31 to A33 respectively, and data concerning actions that the player can perform toward the virtual character in the opening scene. For example, in the opening scene data A1, the action A11 includes data defining the action of the virtual character in the action A11 and data concerning the actions that the player can perform toward the virtual character in the action A11. The action A11 is executed based on the data related to the action A11 in the start scene data A1.

In a case where the opening scene is executed such that the action A11, the action A21, and the action A31 are sequentially performed in the stated order, the virtual character performs an action to make conversation about a topic in the action A11, the virtual character subsequently performs an action to make conversation about another topic in the action A21, and the virtual character performs an action to make conversation about yet another topic in the action A31. The switch from one action to another action may be performed seamlessly so that the player 5 does not perceive the action switch.

While the actions A11, A21 to A23, and A31 to A33 are executed, the player 5 can perform actions toward the virtual character by gazing at a predetermined part of the virtual character or any other method. In response to the action of the player 5 performed toward the virtual character, the virtual character can take a reaction determined based on the start scene data A1. As described above, the actions A11, A21 to A23, and A31 to A33 are executed depending on the actions of the player 5 and based on the start scene data A1.

In parallel with the execution of the actions A11, A21 to A23, and A31 to A33, the suspension determination is performed. The suspension condition may be satisfied with an action of the player 5 during the execution of the action A11, A21 to A23, A31 to A33. When it is determined that the suspension condition is satisfied during the execution of any of the actions A11, A21 to A23, and A31 to A33, a suspension process A41 for suspending the currently executed action is performed. The determination whether the suspension condition is satisfied is performed, for example, by the suspension determination unit 21c5.

The actions A11, A21 to A23, and A31 to A33 each include a main action, an interrupt action, and a return action. In the example shown in FIG. 12, the action A21 includes a main action A211, an interrupt action A212, and a return action A213. Similarly to the action A21, the other actions may each include the main action, the interrupt action, and the return action. The main action, the interrupt action, and the return action will be described below by taking the action A21 as an example.

The main action A211 is a series of actions that the virtual character performs and based on which the game is progressed. For example, when the opening scene is a scene in which a conversation is made between the player 5 and the virtual character, the main action A211 is an action in which the virtual character makes a series of conversations to the player 5.

The interrupt action A212 is an action of the virtual character that is executed in response to a specific action of the player 5 toward the virtual character during the execution of the main action A211, and the main action A211 is suspended for execution of the interrupt action A212. In this specification, an action performed by the player 5 during execution of the main action may be referred to as a specific action. The interrupt action A212 may be a reaction to the specific action of the player 5. For example, in a case where the specific action is motion of touching the head of the virtual character, the interrupt action A212 may be a motion of the virtual character expressing surprise at the touching motion of the player. When the suspension condition is satisfied by the specific action being performed, the suspension process A41 is performed instead of the interrupt action A212.

After the interrupt action A212 is executed, the return action A213 is performed, and thereafter, the main action A211 is resumed. The return action A213 is an action for naturally returning to the conversation performed in the main action A211. The execution of the main action A211 is temporarily suspended by the interrupt action A212, and it is possible to return to the main action A211 more naturally by interposing the return action A213, instead of directly returning from the interrupt action A212 to the main action A211. The return action A213 is, for example, speaking a conjunction colloquially such that the virtual character says "so" or "well". By speaking a colloquial conjunction just before returning to the main action A211, it is possible to return naturally to the conversation in the main action A211. The main action A211 is resumed from the point of being interrupted by the specific action.

As described above, the suspension determination is performed in parallel with the execution of the actions A11, A21 to A23, and A31 to A33, and when it is determined that the suspension condition is satisfied during the execution of any of the actions, the suspension process A41 for suspending the currently executed action is performed. In the suspension process A41, the main action being executed is suspended. Further, in the suspension process A41, a scene transition screen displayed at the time of switching between scenes may displayed in order to let the player 5 know that switching to another action, another scene, or another mode is to be performed. The scene transition screen will be described later.

In one embodiment, after the suspension process A41 is performed in the action A21, the game may be resumed at the action (eg, the action A31) in the lower level situated below the suspended action. For example, the action A31 may be executed after the scene transition screen is displayed in the suspension process A41 for suspending the action A21. In this way, the action A21 satisfying the suspension condition is skipped after it is determined that the interruption condition is satisfied and the suspension process A41 is performed, and then another action (for example, the action A31) in the lower level is started.

In another embodiment, a scene termination process A51 may be executed after the suspension process A41 is performed in the action A21. That is, in response to the determination that the suspension condition is satisfied, a termination process for terminating the opening scene including the action A21 in execution may be performed. In the scene termination process A51, the opening scene in which the action A21 is performed is ended, the VR process proceeds to step S42, and a process for executing the basic scene subsequent to the start scene is started in this step S42.

In still another embodiment, a VR termination process A61 may be executed after the suspension process A41 is performed in the action A21. In the VR termination process A61, the process for terminating the VR mode and shifting to the chat mode is performed. This VR termination process A61 is the same process as the ending process in step S48 described later.

When the suspension process A41 is not performed (that is, when the suspension condition is not satisfied in the opening scene), the opening scene is ended when the action A31, the action A32, the action A33 in the terminal layer, or the action A23 ends, and the VR process proceeds to step S42.

In step S42, the basic scene to be executed is selected from among a plurality of possible basic scenes. Selection of the basic scene to be executed is performed from among a plurality of possible basic scenes prepared for the first scenario, for example, according to the parameter data 28d. In the first scenario, three basic scenes corresponding to the basic scene data B1 to B3 illustrated in FIG. 4 are provided. In one embodiment, the basic scene to be executed is selected from among these three basic scenes based on the favorability rated by the virtual character with respect to the player 5, the favorability is stored as the parameter data 28d. For example, when the favorability is equal to or higher than a first threshold value, the basic scene corresponding to the basic scene data B1 is selected. When the favorability is lower than a second threshold value, the basic scene corresponding to the basic scene data B3 is selected. When the favorability is equal to or higher than the second threshold value and lower than the first threshold value, the basic scene corresponding to the basic scene data B2 is selected. Selection of the basic scene may be performed by any other method other. For example, the basic scene may be randomly selected. The basic scene may be randomly selected after performing weighting of the possible basic scenes so that the probability that some basic scene(s) (for example, the first basic scene corresponding to the basic scene data B1) are selected becomes higher as the favorability is higher. The method of selecting the basic scene is not limited to the method explicitly described in the specification. Once the basic scene is selected, the VR process proceeds to step S43.

In step S43, the basic scene selected in step S42 is executed. More specifically, image information of the virtual space corresponding to the basic scene is generated, and an image corresponding to the image information is output to the display 24. In the basic scene, the virtual character may perform a prescribed action in the virtual space. As with the opening scene, the action which the virtual character performs in the basic scene may be defined as a series of branchable actions. A series of branchable actions in the basic scene may have a data structure similar to the data structure shown in FIG. 12. In the same manner as the opening scene, the suspension determination may be performed in parallel with the execution of the actions in the basic scene. If it is determined that the suspension condition is satisfied in the suspension determination, the suspension process for suspending the action in execution is performed. The suspension process in the basic scene may be performed in the same manner as the suspension process A41 in the opening scene. Similarly to the opening scene, after the suspension determination in the basic scene is performed, a process for shifting to an action in the lower layer from the suspended action, the termination process of the basic scene, or the termination process of the VR mode may be performed. The switch condition is set for the basic scene. When the action situated in the bottom layer in the basic scene is completed, the basic scene ends and the VR process proceeds to step S44.

In step S44, it is determined whether the condition for switching to the additional scene set for the basic scene executed in step S43 is satisfied. In the determination, the condition for switching to the additional scene included in the basic scene data (for example, the basic scene data B1) corresponding to the basic scene executed in step S43 is retrieved from the storage 27, and it is determined whether the condition is satisfied in the basic scene executed in step S43. For example, when the switch condition is that the player gazes at an object representing a door in the virtual space for more than three seconds, counted is the duration of time in which the gazing point of the player 5 in the virtual space is located on the object representing the door, and it is determined that the switch condition is satisfied when the counted time is three seconds or longer. The gazing point of the player 5 in the virtual space is calculated on the basis of the orientation of the HMD 10 calculated based on the detection information from the sensor unit 25. The condition for switching to the additional scene may or may not be explicitly presented to the player 5 at the time of execution of the basic scene. For example, in the basic scene, the virtual character may speak to the player 5 the line corresponding to the condition for switching to the additional scene.

When it is determined that the switch condition is not satisfied, the VR process proceeds to step S45, whereas when it is determined that the switch condition is satisfied, the VR process proceeds to step S46.

In step S45, a first ending scene is executed. More specifically, image information of the virtual space corresponding to the first ending scene is generated, and an image corresponding to the image information is output to the display 24.

In step S46, an additional scene is executed. More specifically, image information of the virtual space corresponding to the additional scene is generated, and an image corresponding to the image information is output to the display 24. Similarly to the opening scene, the action that the virtual character performs in the additional scene may be defined as a series of branchable actions. A series of branchable actions in the additional scene may have a data structure similar to the data structure shown in FIG. 12. When the action situated in the bottom layer in the additional scene is completed, the additional scene ends and the VR process proceeds to step S47.

In step S47, a second ending scene is executed. More specifically, image information of the virtual space corresponding to the second ending scene is generated, and an image corresponding to the image information is output to the display 24. The image displayed in the second ending scene may be the same as or different from the image displayed in the first ending scene.

In the same manner as the opening scene and the basic scene, the suspension determination may be performed in parallel with the execution of the actions in the additional scene, the first ending scene, and the second ending scene. If it is determined that the suspension condition is satisfied in the suspension determination, the suspension process for suspending the action in execution is performed. The suspension process in the additional scene, the first ending scene, and the second ending scene may be performed in the same manner as the suspension process A41 in the opening scene. Similarly to the opening scene, after the suspension determination in the additional scene, the first ending scene, and the second ending scene is performed, a process for shifting to an action in the lower layer from the suspended action, the termination process of the scene in execution, or the termination process of the VR mode may be performed.

In the above-described VR process, when switching between scenes is performed, a scene transition screen may be generated and the scene transition screen may be displayed on the display 24. The scene transition screen is any screen that allows the player 5 to recognize that the scene is to be switched. For example, the scene transition screen may be a fade-out screen having the entire image is colored in black. This fade-out screen may be displayed at least one timing selected from the group including: at the time of switching from the opening scene to the basic scene (before displaying the VR screen in the basic scene); at the time of switching from the basic scene to the first ending scene (before displaying the VR screen in the first ending scene); at the time of switching from the basic scene to the additional scene (before displaying the VR screen in the additional scene); and at the time of switching from the additional scene to the second ending scene (before displaying the VR screen in the second ending scene).

When movement of the head of the player 5 is detected by the sensor unit 25 of the HMD 10 while the VR image 90 is displayed on the display 24, an action of the player 5 is specified based on the detected movement of the head. Then, an action (reaction) of the virtual character responsive to the specified action of the player 5 is determined. Subsequently image information of the virtual character image 91 that performs the specified action is generated. The image information generated in this way is output to the display 24. For example, when a nodding motion of the player 5 is detected, image information of the virtual character image 91 taking a reaction to the action of the player 5 which is the nodding is generated, and the image information is displayed on the display 24. In this manner, in the VR mode, interaction between the player 5 and the virtual character is realized using the stereoscopic image of the virtual character.

In the above-described steps S41, S43, S45 to S47, the parameter(s) set for the player 5 may be increased or decreased according to the action(s) of the player 5. As described above, the increase/decrease amount or change rate of the parameter may be determined based on the change amount (for example, increase amount or decrease amount) or the change rate (increase rate or decrease rate) of the parameter determined for each type of the action of the player 5. When the change amount or the change rate of the parameter is specified, the parameter data 28*d* is updated based on the specified change amount or change rate of the favorability.

In step S48, the termination process of the VR mode is performed. The termination process may include, displaying, on the display 24, guidance for prompting the player to remove the information processing device 20 from the attachment 11, and displaying a login screen to log in to the chat mode which is the first mode.

The above VR process is executed by the VR mode execution unit 21*c*. The VR mode execution unit 21*c* is capable of executing the VR process alone or in cooperation with other functions as needed.

Figure 13:
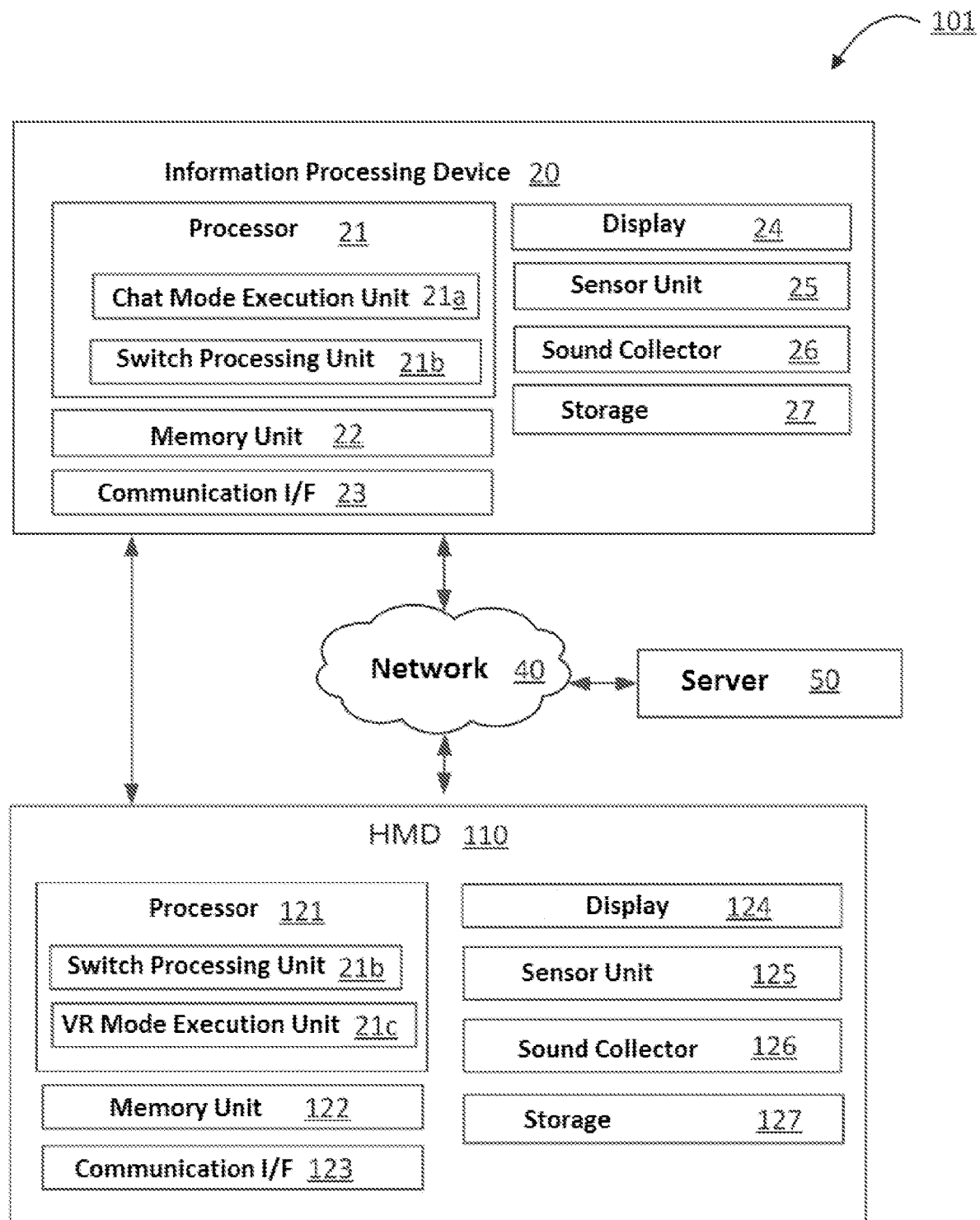
FIG. 13 is a block diagram illustrating a game processing system according to another embodiment.

The game processing system according to another embodiment will be described with reference to FIG. 13. FIG. 13 is a block diagram illustrating a game processing system 101 according to another embodiment. The game processing system 101 includes the information processing device 20, and the HMD 110. The game processing system 101 is different from the game processing system 1 in that the VR mode can be provided without attaching the information processing device 20 to the HMD 110. Hereinafter, the game processing system 101 will be described focusing on the differences from the game processing system 1.

The HMD 110, the information processing device 20, and the server 50 are communicably interconnected over the network 40. The HMD 110 and the information processing device 20 may be connected so as to communicate with each other according to a short-range wireless system such as Bluetooth (registered trademark) without using the network 40. The HMD 110 is different from the HMD 10 of the game processing system 1 in that the VR mode can be provided even if the information processing device 20 is not mounted.

The HMD 110 includes a computer processor 121, a memory unit 122, a communication I/F 123, a display 124, a sensor unit 125, a sound collector 126, and a storage 127. The computer processor 121, the memory unit 122, the communication I/F 123, the display 124, the sensor unit 125, the sound collector 126, and the storage 127 are configured similarly to the computer processor 21 the memory 22, the communication I/F 23, the display 24, the sensor unit 25, the sound collector 26, and the storage 27 of the information processing device 20, respectively. However, the display 124 may not have a touch-screen panel.

The functions of the chat mode execution unit 21*a*, the switch processing unit 21*b*, and the VR mode execution unit 21*c* are distributed between the information processing device 20 and the HMD 110. Specifically, the function of the chat mode execution unit 21*a* is realized in the information processing device 20, and the function of the VR mode execution unit 21*c* is realized in the HMD 110. A part of the function of the switch processing unit 21*b* is realized by the information processing device 20, and the rest is realized in the HMD 110. The function of the parameter management unit 21*d* is realized by both the information processing device 20 and the HMD 110.

The image data 28*a*, the chat data 28*b*, the scenario data 28*c*, the parameter data 28*d*, the suspension condition data 28*e*, and the game progress data 28*f* are stored in one or both of the storage 27 and the storage 127. Alternatively these data may be stored in a storage other than the storage 27 and the storage 127.

When starting the game in the game processing system 101, the player 5 uses the information processing device 20 to start the chat mode. The process for executing the chat mode is performed by the chat mode execution unit 21*a* of the information processing device 20.

When the mode switch condition is satisfied in the chat mode and the switch start object is selected, the mode switch process switching to the VR mode is started. The mode switch process is performed by the switch processing unit 21*b*. In the mode switch process, displaying the guidance corresponding to the above-described step S31 is performed in the information processing device 20. For example, guidance prompting the player to put on the HMD 110 is displayed on the display 24 of the information processing device 20. Displaying the switch object 86 corresponding to step S32 and subsequent processes are executed in the HMD 110.

When the VR mode is started, the processing of the VR mode is performed by the VR mode execution unit 21*c* of the HMD 110.

Figure 14:
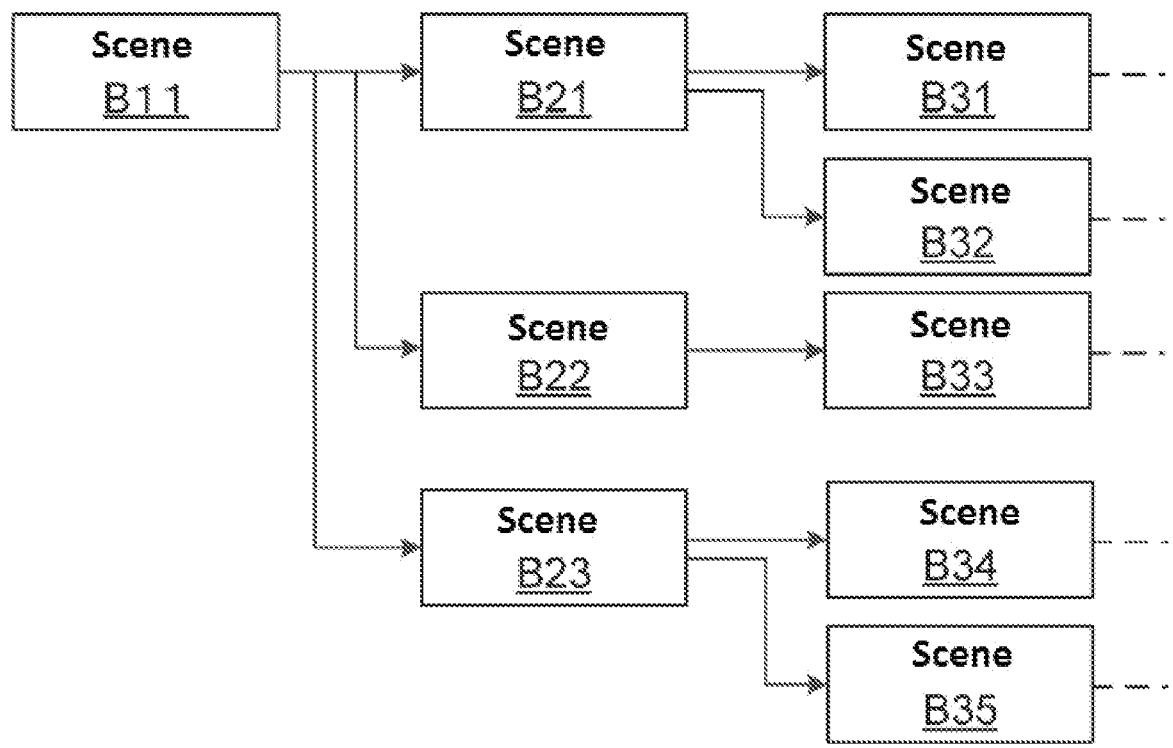
FIG. 14 schematically illustrates scenes constituting the game according to another embodiment.

In another embodiment, the game processing system 1 or the game processing system 101 processes games other than games that provide interaction with virtual characters, such as role playing games, shooting games and any other games. In the game according to this embodiment, the game scenario is composed of a plurality of game scenes. FIG. 14 schematically shows a plurality of scenes constituting a game according to the embodiment. As shown in FIG. 14, the game in the embodiment includes a plurality of scenes including nine scenes B11, B21 to B23, and B31 to B35. Each of the plurality of scenes may be branched into two or more scenes. For example, the scene B11 is branched into three scenes B21 to B23. When the game is executed, a destination scene is selected at each branch point according to selection made by the player 5, the values of various parameters, and various other conditions. In each scene, the game progresses in accordance with command sets stored in advance in the storage 27, the storage 127, or other storage. The command set of each scene includes the actions that the player character is able to perform in the scene, the actions that the non-player character is able to perform in the scene, the data concerning the image and position of the object(s) displayed in the scene, and any other information necessary for execution of the scene. In the embodiment, the suspension condition data 28*e* may include data defining a scene suspension condition that is a condition for suspending the game in execution in the VR mode or a scene executed in the game. The scene suspension condition may be the same as the suspension condition for suspending the action.

Determination whether the scene suspension condition is satisfied may be performed in parallel to the processing of the scenes B11, B21 to B23, B31 to B35, and other scenes. The determination of the scene suspension condition may be performed by, for example, the suspension determination unit 21*c*5. When it is determined that the scene suspension condition is satisfied in a scene, the suspension process for suspending the processing of the scene is performed. After the suspension process, the game may be resumed from a scene situated in a lower layer below the suspended scene. For example, when the scene B21 is suspended, the game may be resumed from the scene B31 or the scene B32 located downstream thereof. The process for terminating the VR mode may be performed after the suspension process is performed on a scene. Further, in the suspension process of suspending the scene, the scene transition screen may be displayed to let the player 5 know that switching to another scene or another mode is going to be performed.

According to the above embodiments, the following advantageous effects can be obtained. According to the game processing system 1, 101 described above, when the suspension condition is satisfied during execution of a predetermined action in a predetermined scene (for example, the action A21 in the opening scene), the action is suspended. Therefore, there is no need to define the reaction of the virtual character to the action of the player that is to be executed after the suspension condition is satisfied. Accordingly, it is possible to suppress an increase of the data defining the action of the virtual character performed responsive to the action of the player or the data amount of the command set for each scene (for example, the data amount of the scenario data 28*c*).

Further, according to the game processing system 1, 101, since the scene transition screen is displayed when the action or scene is suspended, it is possible to naturally interrupt the action or the scene.

In addition, an action that is deemed inappropriate in the real world may be defined as the banned action, and the game may be suspended when such an action is performed toward the virtual character. It is difficult to predetermine reactions of the virtual character to the actions considered to be inappropriate in the real world. Whereas if the virtual character performs a normal reaction to the inappropriate action or does not perform any reaction, the normal reaction would be deemed unnatural as a reaction to the inappropriate action in the real world. According to the above-described game processing system 1, 101, by suspending the execution of the game when an action that is deemed inappropriate in the real world is made, so that it is possible to prevent the virtual character from taking an unnatural reaction (or no reaction). In this way, it is possible to enhance a sense of reality of communication with the virtual character can be increased.

Embodiments of the disclosure are not limited to the above embodiments but various modifications are possible within a spirit of the invention. For example, some or all of the functions executed by the computer processor 21 and the computer processor 121 may be realized by a computer processor which is not shown in the above-mentioned embodiment without departing from the scope of the invention. For example, the game processing system 1 and the game processing system 101 may include a game machine that executes at least a part of the game processing program. Some of the functions realized by processing by the computer processor 21 or the computer processor 121 may be realized by processing performed by the game machine.

Embodiments of the disclosure may include various devices, devices, and electronic components other than those described above. For example, in addition to the information processing device 20 and the HMD 10, 110, the game processing system 1 and the game processing system 101 may be provided with a control device for accepting operations of the player 5. The game processing system 1 and the game processing system 101 may detect operations of the player 5 via the control device and process the game in accordance with the detected operations. The virtual character in the virtual space may be controlled based on data or commands other than the data concerning actions of the virtual character included in the scenario data 28*c*. For example, the virtual character may be controlled to move in synchronization with movements of a player other than the player 5. In one embodiment, the server 50 may generate an animation of a virtual character based on motion data indicating body movements and/or facial expression movements of the player other than the player 5. The server 50 may cause the display 24 of the information processing device 20 to display an image of the virtual space including the virtual character generated as described above. In this way, the player 5 is able to interact with the virtual character moving in synchronization with the movements of another player. Generation of an animation that moves in synchronization with movements of a player (user) is described in Japanese Patent Application No. 2018-236152, the content of which is incorporated herein by reference in its entirety. In one embodiment, an animation of a virtual character moving in synchronization with movements of the player 5 in the real space may be generated based on motion data indicating body movements and facial expression movements of the player 5, and the virtual space may include the virtual character of the player 5. In this way, the player 5 is able to interact with other player(s) through the virtual character in the virtual space.

The procedures described herein, particularly those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present disclosure.

What is claimed is:

1. A game processing system for processing a game that provides interaction with a virtual character, comprising:
   a storage storing suspension condition data defining a suspension condition; and
   one or more computer processors,
   wherein the game has a first mode and a second mode; in the first mode, the game is played in a first three-dimensional space, and in the second mode, the game is played in a second three-dimensional space different from the first three-dimensional space, and
   wherein the one or more computer processors execute computer-readable instructions to:
   determine, in the second mode, a player action of a player performed toward the virtual character based on detection information obtained by a head mounted display attached to a head of the player;
   determine whether the suspension condition is satisfied based on the suspension condition data; and
   when determining that the suspension condition is satisfied, suspend the second mode and perform a switch process for switching to the first mode.

2. The game processing system of claim 1, wherein a same game content is used in the first mode and the second mode.

3. The game processing system of claim 2, wherein a first parameter associated with the game content is carried over between the first mode and the second mode.

4. The game processing system of claim 3, wherein the first parameter is changed when the game is switched from the second mode to the first mode.

5. The game processing system of claim 1, wherein a second parameter associated with the player is carried over between the first mode and the second mode.

6. The game processing system of claim 5, wherein the second parameter is favorability of the virtual character with respect to a user character, the user character being a character used by the player in the game.

7. The game processing system of claim 5, wherein the game progresses in accordance with the second parameter.

8. The game processing system of claim 1, wherein the suspension condition includes that a gazing point determined based on the detection information is located on a prohibited area set in the second three-dimensional space.

9. The game processing system of claim 1, wherein the suspension condition includes that the player repeats a same player action more than a predetermined number of times.

10. The game processing system of claim 1, wherein the suspension condition includes that the player performs a player action on a predetermined part of the virtual character more than a predetermined number of times.

11. The game processing system of claim 1, wherein the suspension condition includes that the player performs a player action deemed as a banned action.

12. The game processing system of claim 5,
wherein the storage stores the second parameter updated in accordance with an action of the player,
wherein the suspension condition includes that the second parameter is equal to or greater than a predetermined threshold value, or equal to or less than a predetermined threshold value.

13. The game processing system of claim 1, wherein the storage stores action data for specifying a plurality of actions of the virtual character.

14. The game processing system of claim 1, wherein whether the suspension condition is satisfied based on the determined player action of the player and the suspension condition data.

15. A method of processing a game that provides interaction with a virtual character by one or more computer processors executing computer-readable instructions, the game having a first mode and a second mode; in the first mode, the game being played in a first three-dimensional space, and in the second mode, the game being played in a second three-dimensional space different from the first three-dimensional space, the method comprising the steps of:
determining, in the second mode, a player action of a player performed toward the virtual character based on detection information obtained by a head mounted display attached to a head of the player;
determining whether a suspension condition is satisfied based on suspension condition data ; and
when determining that the suspension condition is satisfied, suspending the second mode and performing a switch process for switching to the first mode.

16. A non-transitory computer-readable storage medium storing a program for processing a game that provides interaction with a virtual character, the program being executed by one or more computer processors, the game having a first mode and a second mode; in the first mode, the game being played in a first three-dimensional space, and in the second mode, the game being played in a second three-dimensional space different from the first three-dimensional space, the program causing the one or more computer processors to:
determine, in the second mode, a player action of a player performed toward the virtual character based on detection information obtained by a head mounted display attached to a head of the player;
determine whether a suspension condition is satisfied based on suspension condition data ; and
when determining that the suspension condition is satisfied, suspend the second mode and perform a switch process for switching to the first mode.

\* \* \* \* \*